US006745240B1

(12) United States Patent
Denman et al.

(10) Patent No.: US 6,745,240 B1
(45) Date of Patent: Jun. 1, 2004

(54) METHOD AND APPARATUS FOR CONFIGURING MASSIVELY PARALLEL SYSTEMS

(75) Inventors: Robert W. Denman, Los Angeles, CA (US); John E. Merritt, Torrance, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/440,354

(22) Filed: Nov. 15, 1999

(51) Int. Cl.[7] .............................................. G06F 15/177
(52) U.S. Cl. ...................... 709/220; 709/221; 709/222; 709/223; 712/15
(58) Field of Search ................................ 709/220, 221, 709/222, 223; 712/15

(56) References Cited

U.S. PATENT DOCUMENTS

| 3,290,446 | A | 12/1966 | Ceonzo |
| 3,317,676 | A | 5/1967 | Ekbergh et al. |
| 3,491,211 | A | 1/1970 | Bininda et al. |
| 3,540,000 | A | 11/1970 | Bencher |
| 3,581,286 | A | 5/1971 | Beausoleil |
| 3,582,560 | A | 6/1971 | Banks |
| 3,693,155 | A | 9/1972 | Crafton et al. |
| 3,963,872 | A | 6/1976 | Hagstrom et al. |
| 4,022,982 | A | 5/1977 | Hemdal |
| 4,038,638 | A | 7/1977 | Hwang |
| 4,074,072 | A | 2/1978 | Christensen et al. |
| 4,075,693 | A | 2/1978 | Fox et al. |
| 4,081,612 | A | 3/1978 | Hafner |
| 4,146,749 | A | 3/1979 | Pepping et al. |
| 4,173,713 | A | 11/1979 | Giesken |
| 4,177,514 | A | 12/1979 | Rupp |
| 4,201,889 | A | 5/1980 | Lawrence et al. |
| 4,201,891 | A | 5/1980 | Lawrence et al. |
| 4,237,447 | A | 12/1980 | Clark |
| 4,247,892 | A | 1/1981 | Lawrence |
| 4,251,879 | A | 2/1981 | Clark |
| 4,307,446 | A | 12/1981 | Barton et al. |
| 4,317,193 | A | 2/1982 | Joel, Jr. |
| 4,344,134 | A | 8/1982 | Barnes |
| 4,347,498 | A | 8/1982 | Lee et al. |
| 4,412,285 | A | 10/1983 | Neches et al. |
| 4,417,244 | A | 11/1983 | Melas |
| 4,417,245 | A | 11/1983 | Melas |

(List continued on next page.)

FOREIGN PATENT DOCUMENTS

EP  0 404 423  12/1990

OTHER PUBLICATIONS

US 5,867,679, 2/1999, Tanaka et al. (withdrawn)
Shintani et al., "Performance Analysis for Parallel Generalized Association Rule Mining on a Large Scale PC Cluster," 1999, from http://www.tkl.iis.u-tokyo.ac.jp/Kilab/Research/Paper/1999/shintani/europar99.ps.*

(List continued on next page.)

Primary Examiner—Glenton B. Burgess
Assistant Examiner—Bradley Edelman
(74) Attorney, Agent, or Firm—Gates & Cooper LLP

(57) ABSTRACT

A method, apparatus, article of manufacture, and a memory structure for configuring a massively parallel processing system is disclosed. The method comprises the steps of selecting one of the interconnected nodes as a coordinator node, and the remaining nodes a non-coordinator nodes, the coordinator node for controlling the configuration of the parallel processing system; defining, in the coordinator node, a parallel processing system configuration having member nodes; and multicasting the parallel processing system configuration to the nodes. The apparatus comprises a means for performing the steps described above, and the article of manufacture comprises a program storage device tangibly embodying computer instructions for performing the above method steps.

27 Claims, 29 Drawing Sheets

U.S. PATENT DOCUMENTS

| | | |
|---|---|---|
| 4,445,171 A | 4/1984 | Neches |
| 4,456,987 A | 6/1984 | Wirsing |
| 4,466,060 A | 8/1984 | Riddle |
| 4,481,623 A | 11/1984 | Clark |
| 4,484,262 A | 11/1984 | Sullivan et al. |
| 4,486,877 A | 12/1984 | Turner |
| 4,491,945 A | 1/1985 | Turner |
| 4,494,185 A | 1/1985 | Gunderson et al. |
| 4,518,960 A | 5/1985 | Clark |
| 4,523,273 A | 6/1985 | Adams, III et al. |
| 4,543,630 A | 9/1985 | Neches |
| 4,550,397 A | 10/1985 | Turner et al. |
| 4,561,090 A | 12/1985 | Turner |
| 4,577,308 A | 3/1986 | Larson |
| 4,621,359 A | 11/1986 | McMillen |
| 4,622,632 A | 11/1986 | Tanimoto et al. |
| 4,623,996 A | 11/1986 | McMillen |
| 4,630,258 A | 12/1986 | McMillen |
| 4,630,260 A | 12/1986 | Toy et al. |
| 4,633,394 A | 12/1986 | Georgiou et al. |
| 4,638,475 A | 1/1987 | Koike |
| 4,651,318 A | 3/1987 | Luderer |
| 4,656,622 A | 4/1987 | Lea et al. |
| 4,661,947 A | 4/1987 | Lea et al. |
| 4,663,620 A | 5/1987 | Paul et al. |
| 4,670,871 A | 6/1987 | Vaidya |
| 4,679,186 A | 7/1987 | Lea |
| 4,695,999 A | 9/1987 | Lebizay |
| 4,701,906 A | 10/1987 | Ransom et al. |
| 4,706,150 A | 11/1987 | Lebizay et al. |
| 4,707,781 A | 11/1987 | Sullivan |
| 4,731,825 A | 3/1988 | Wojcinski et al. |
| 4,731,878 A | 3/1988 | Vaidya |
| 4,734,907 A | 3/1988 | Turner |
| 4,740,954 A | 4/1988 | Cotton |
| 4,742,511 A | 5/1988 | Johnson |
| 4,745,593 A | 5/1988 | Stewart |
| 4,761,780 A | 8/1988 | Bingham |
| 4,766,534 A | 8/1988 | DeBenedictis |
| 4,780,873 A | 10/1988 | Mattheyses |
| 4,782,478 A | 11/1988 | Day, Jr. et al. |
| 4,785,446 A | 11/1988 | Dias et al. |
| 4,809,362 A | 2/1989 | Claus et al. |
| 4,811,210 A | 3/1989 | McAulay |
| 4,814,973 A | 3/1989 | Hillis |
| 4,814,979 A | 3/1989 | Neches |
| 4,814,980 A | 3/1989 | Peterson |
| 4,817,084 A | 3/1989 | Arthurs et al. |
| 4,819,159 A | 4/1989 | Shipley et al. |
| 4,829,227 A | 5/1989 | Turner |
| 4,833,468 A | 5/1989 | Larson et al. |
| 4,833,671 A | 5/1989 | Becker et al. |
| 4,845,722 A | 7/1989 | Kent et al. |
| 4,845,736 A | 7/1989 | Posner et al. |
| 4,845,744 A | 7/1989 | DeBenedictis |
| 4,847,755 A | 7/1989 | Morrison et al. |
| 4,849,751 A | 7/1989 | Barber et al. |
| 4,860,201 A | 8/1989 | Stolfo et al. |
| 4,864,558 A | 9/1989 | Imagawa et al. |
| 4,866,701 A | 9/1989 | Giacopelli et al. |
| 4,925,311 A | 5/1990 | Neches et al. |
| 4,945,471 A | 7/1990 | Neches |
| 4,956,772 A | 9/1990 | Neches |
| 4,962,497 A | 10/1990 | Ferenc et al. |
| 4,982,187 A | 1/1991 | Goldstein et al. |
| 5,006,978 A | 4/1991 | Neches |
| 5,022,025 A | 6/1991 | Urushidani et al. |
| 5,031,089 A | 7/1991 | Liu et al. |
| 5,039,980 A | 8/1991 | Aggers et al. |
| 5,088,091 A | 2/1992 | Schroeder et al. |
| 5,119,369 A | 6/1992 | Tanabe et al. |
| 5,119,370 A | 6/1992 | Terry |
| 5,121,384 A | 6/1992 | Ozeki et al. |
| 5,131,041 A | 7/1992 | Brunner et al. |
| 5,148,540 A | 9/1992 | Beardsley et al. |
| 5,199,027 A | 3/1993 | Barri |
| 5,214,642 A | 5/1993 | Kunimoto et al. |
| 5,313,628 A | 5/1994 | Mendelsohn et al. |
| 5,321,813 A | 6/1994 | McMillen et al. |
| 5,404,544 A | 4/1995 | Crayford |
| 5,521,972 A * | 5/1996 | Iki .............................. 379/230 |
| 5,522,046 A | 5/1996 | McMillen et al. |
| 5,522,077 A | 5/1996 | Cuthbert et al. |
| 5,634,015 A | 5/1997 | Chang et al. |
| 5,640,596 A | 6/1997 | Takamoto et al. |
| 5,706,347 A | 1/1998 | Burke et al. |
| 5,708,772 A | 1/1998 | Zeldin et al. |
| 5,732,086 A | 3/1998 | Liang et al. |
| 5,815,793 A | 9/1998 | Ferguson |
| 5,838,659 A | 11/1998 | Kainulainen |
| 5,838,937 A | 11/1998 | Lee et al. |
| 5,884,090 A | 3/1999 | Ramanan et al. |
| 5,896,516 A | 4/1999 | Powell, Jr. et al. |
| 5,907,684 A | 5/1999 | Halma et al. |
| 5,924,093 A * | 7/1999 | Potter et al. .................... 707/7 |
| 5,926,463 A | 7/1999 | Ahearn et al. |
| 5,940,592 A | 8/1999 | Ioki et al. |
| 6,014,669 A * | 1/2000 | Slaughter et al. ............. 707/10 |
| 6,065,065 A | 5/2000 | Murakami et al. |
| 6,173,420 B1 * | 1/2001 | Sunkara et al. ............... 714/38 |
| 6,393,485 B1 * | 5/2002 | Chao et al. ................. 709/231 |
| 6,400,850 B1 * | 6/2002 | Nonomura .................. 382/285 |
| 6,401,120 B1 * | 6/2002 | Gamache et al. ........... 709/226 |
| 6,412,002 B1 * | 6/2002 | Denman et al. ............ 709/224 |
| 6,418,526 B1 * | 7/2002 | Denman et al. .............. 712/16 |
| 6,438,582 B1 * | 8/2002 | Hsiao et al. ................. 709/206 |
| 6,438,705 B1 * | 8/2002 | Chao et al. .................... 714/4 |
| 6,449,641 B1 * | 9/2002 | Moiin et al. ................ 709/220 |
| 6,519,697 B1 * | 2/2003 | Denman et al. ............... 713/1 |
| 6,532,494 B1 * | 3/2003 | Frank et al. ................. 709/224 |

OTHER PUBLICATIONS

R.J. McMillen, A Study of Multistage Interconnection Networks: Design, Distributed Control, Fault Tolerance, and Performance, PhD Thesis, Purdue University, Dec. 1982.

Dr. Philip M. Neches, "THE YNET: An Interconnect Structure for a Highly Concurrent Data Base System", Teradata Corporation, 1988.

R.D. Rettberg, W.R. Crother, P.P. Carvey, and R.S. Tonalanson, "The Monarch Parallel Processor Hardware Design", *Computer*, Apr. 1990, pp. 18–30.

L. R. Goke and G.J. Lipovski, "Banyan Networks for Partitioning Multiprocessor Systems", *Proceedings of the First Annual Symposium on Computer Architecture*, 1973, pp. 21–28.

T. Feng, "A Survey of Interconnection Networks", *Computer*, Dec. 1981, pp. 12–27.

D.P. Agrawal, "Testing and Fault Tolerance of Multistage Interconnection Networks", *Computer*, Apr. 1982, pp. 41–53.

Burroughs Corporation, "Final Report: Numerical Aerodynamic Simulation Facility; Feasibility Study", Mar. 1979.

G.F. Pfister, W.C. Brantley, D.A. George, S.L. Harvey, W.J. Kleinfelder, K.P. McAuliffe, E.A. Melton, V.A. Norton, and J. Weiss, The IBM Research Parallel Processor Prototype (RP3): Introduction and Architecture:, *Proceedings of the 1985 International Conference on Parallel Processing*, 1985, pp. 764–771.

G.F. Pfister and V.A. Norton, "Hot Spot Contention and Combining in Multistage Interconnection Networks", *Proceedings of the 1985 International Conference on Parallel Processing,* 1985, pp. 790–797.

W.C. Brantley, K.P. McAuliffe, and J. Weiss, "RP3 Processor–Memory Element", *Proceedings of the 1985 International Conference on Parallel Processing,* pp. 782–789.

W. Crowther, J. Goodhue, E. Starr, R. Thomas, W. Milliken and T. Blackadar, "Performance Measurements on a 128–node Butterfly™ Parallel Processor" *Proceedings of the 1985 International Conference on Parallel Processing,* 1985, pp. 531–540.

A. Gottlieb, R. Grishman, C.P. Kuskal, K.P. McAuliffe, L. Rudolph and M. Snir, "The NYU Ultra Computer–Designing and MIMD Shared Memory Parallel Computer", *IEEE Transactions on Computers,* vol. C–32, No. 2, Feb. 1983, pp. 175–189.

Leiserson, "Transactions on Computers", *IEEE,* vol. C–34, No. 10, Oct. 1985.

Peercy, M. et al., "Distributed Algorithms for Shortest–Path, Deadlock–Free Routing and Broadcasting in Arbitrarily Faulty Hypercubes," International Symposium on Fault Tolerant Computing, (FTCS), Jun. 26–28, 1990, Newcastle Upon Tyne, no. Symp. 20, Jun. 26, 1990, IEEE 1990, pp. 218–225.

Rodeheffer, Thomas L et al., "Automatic Reconfiguration in Autonet," Operating Systems Review (SIGOPS), vol. 25, No. 5, Jan. 1, 1991, pp. 183–197.

Kulkarni, Ashok K. et al., "Broadcast Reliability Evaluation of Multistage Interconnection Networks," Proceedings of Southeastcon, Williamsburg, Apr. 7–10, 1991, vol. 1, Jan. 1, 1991, IEEE 1991, pp. 432–436.

Copy of European Patent Office Communication dated Nov. 4, 1998 and Partial European Search Report for European Application No. 92 30 3833.

* cited by examiner

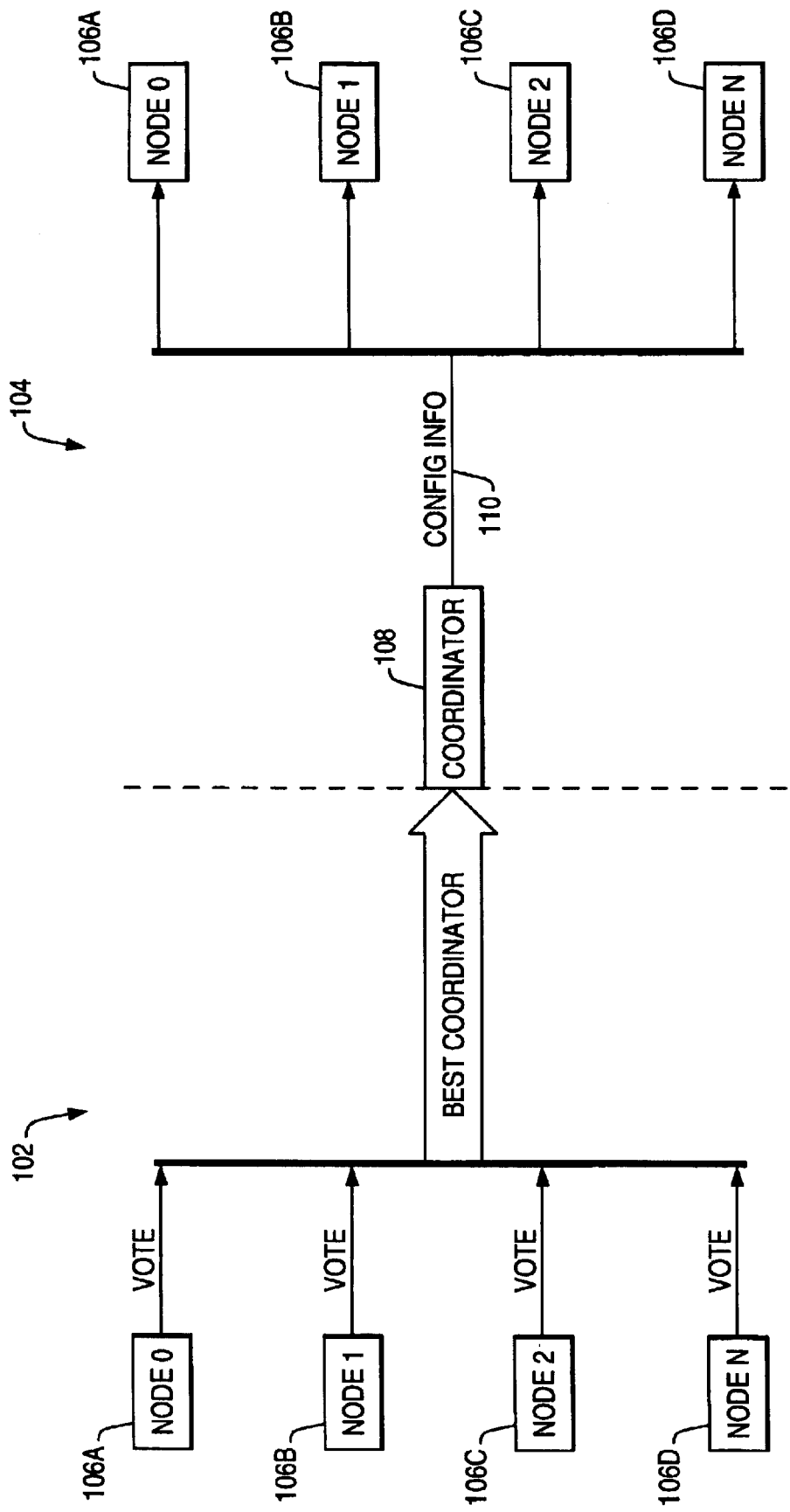

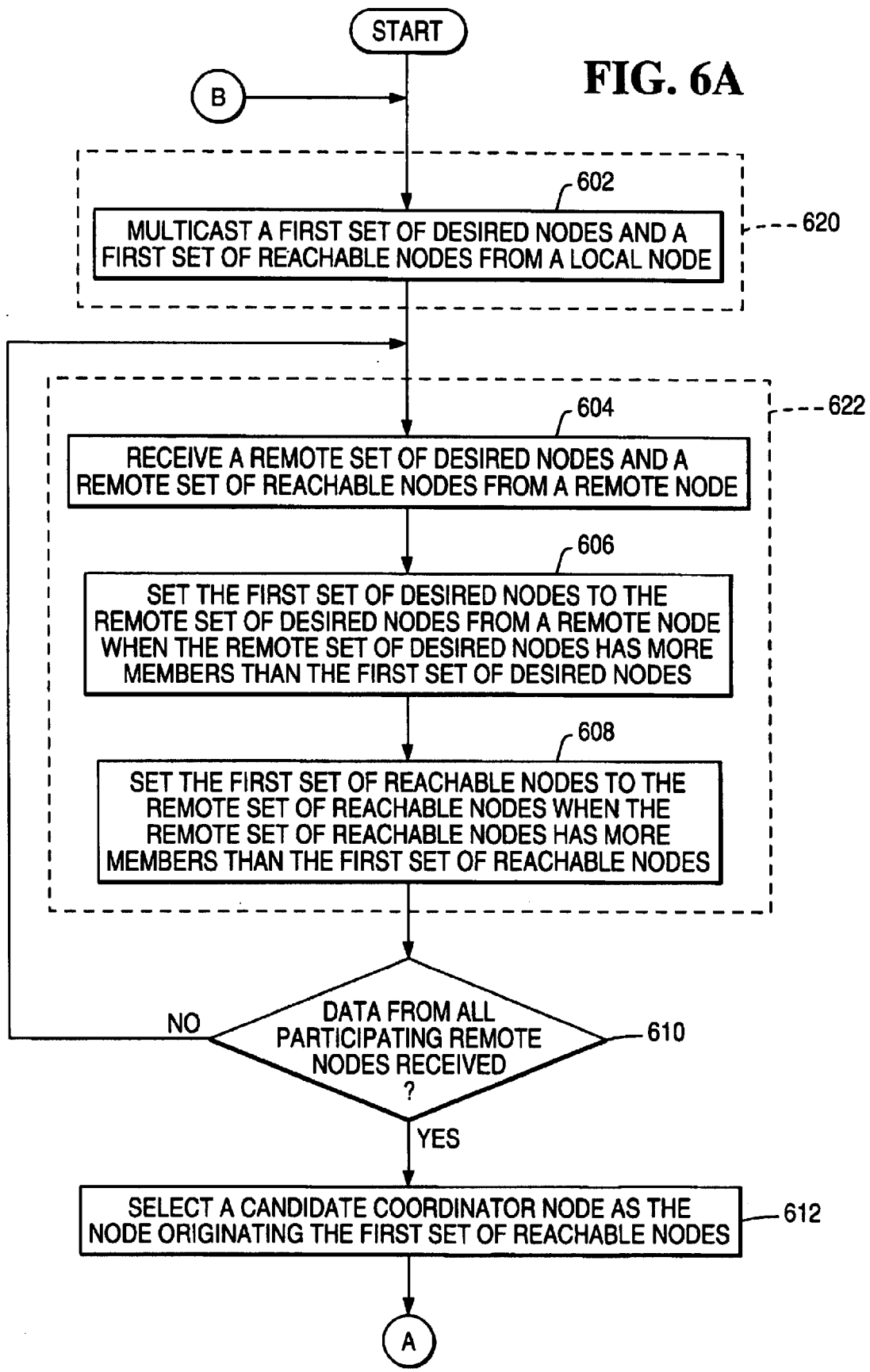

METHOD AND APPARATUS FOR CONFIGURING MASSIVELY PARALLEL SYSTEMS

CROSS-REFERENCE TO RELATED APPLICATIONS

This application is related to the following co-pending and commonly assigned patent applications, all of which applications are incorporated by reference herein:

application Ser. No. 09/440,353, entitled "METHOD AND APPARATUS FOR SYNCHRONIZING NODES IN MASSIVELY PARALLEL SYSTEMS," filed on same date herewith, by Robert W. Denman and John E. Merritt, now U.S. Pat. No. 6,418,526;

application Ser. No. 09/440,439, entitled "METHOD AND APPARATUS FOR COORDINATING THE CONFIGURATION OF MASSIVELY PARALLEL SYSTEMS," filed on same date herewith, by Robert W. Denman and John E. Merritt, now U.S. Pat. No. 6,519,697; and application Ser. No. 09/440,807, entitled "METHOD AND APPARATUS FOR SELECTING NODES IN CONFIGURING MASSIVELY PARALLEL SYSTEMS" filed on same date herewith, by Robert W. Denman and John E. Merritt, now U.S. Pat. No. 6,412,002.

BACKGROUND OF THE INVENTION

1. Field of the Invention

The present invention relates to parallel processing systems, and in particular to a method and system for configuring a massively parallel processing system.

2. Description of the Related Art

Parallel processing is considered an advantageous approach for increasing processing speeds in computer systems. Parallel processing can provide powerful communications and computer systems which can handle complex problems and manipulate large databases quickly and reliably.

One example of parallel processing can be found in U.S. Pat. No. 4,412,285, issued Oct. 25, 1983, to Neches et al., incorporated by reference herein. This patent describes a system using a sorting network to intercouple multiple processors so as to distribute priority messages to all processors. Another example of parallel processing can be found in U.S. Pat. No. 5,321,813 issued Jun. 14, 1994 to McMillen et al., which reference is also hereby incorporated by reference herein.

One of the difficulties associated with parallel processing systems involves the logical configuration of such systems. Prior art parallel processing systems are typically configured with the use of five inter-dependent services for: (1) registering nodes, (2) examining local and global net states, (3) merging global parallel processing info with local info, (4) freezing the selected parallel processing configuration, and (5) selecting or dropping parallel processing nodes. On very large systems, these methods can be unreliable. Further, in some cases, use of these methods can render some of the drivers and interfaces of the massively parallel processing system unusable.

From the foregoing, it can be seen that there is a need for a simplified method for logically configuring parallel processing systems. The present invention satisfies this need.

SUMMARY OF THE INVENTION

To address the requirements described above, the present invention discloses a simplified method, apparatus, and article of manufacture for configuring a parallel processing system.

The present invention uses a voting process to logically configure the parallel processing system. Each node in the system votes for a node that it believes is the best candidate to control the configuration process. The controlling node, also called a coordinator, selects the configuration and distributes the information to all other nodes in the system. Prior art methods of configuring the parallel processing system were less reliable when applied to very large systems and did not support BLLI Bynet drivers and Bynet QBIC interfaces. This invention provides a well-structured and dependable process for configuring massively parallel processors. This invention is particularly useful in the logical configuration a parallel processing system to run the parallel database extensions of the TERADATA database.

More specifically, the method comprises the steps of selecting one of the interconnected nodes as a coordinator node, and the remaining nodes as non-coordinator nodes, the coordinator node for controlling the configuration of the parallel processing system; defining, in the coordinator node, a parallel processing system configuration having member nodes; and multicasting the parallel processing system configuration to the nodes.

The apparatus comprises a means for performing the steps described above, and the article of manufacture comprises a program storage device tangibly embodying computer instructions for performing the above method steps.

Using the steps outlined above, the foregoing invention allows a parallel processing system to be configured with fewer operations and fewer configuration services than possible in the prior art. Specifically, the number of configuration services to be reduced from five to two (one for selecting the coordinator, and the second for configuring the parallel processing system), simplifying software and hardware design, and improving maintainability and reliability as well.

BRIEF DESCRIPTION OF THE DRAWINGS

Referring now to the drawings in which like reference numbers represent corresponding parts throughout:

FIG. 1 is a block diagram depicting a coordinator selection service and a configuration selection service for a parallel processing system;

FIGS. 6A and 6B are flow charts showing the method steps used to select a coordinator node in additional detail;

DETAILED DESCRIPTION OF PREFERRED EMBODIMENT

Figure 2A:
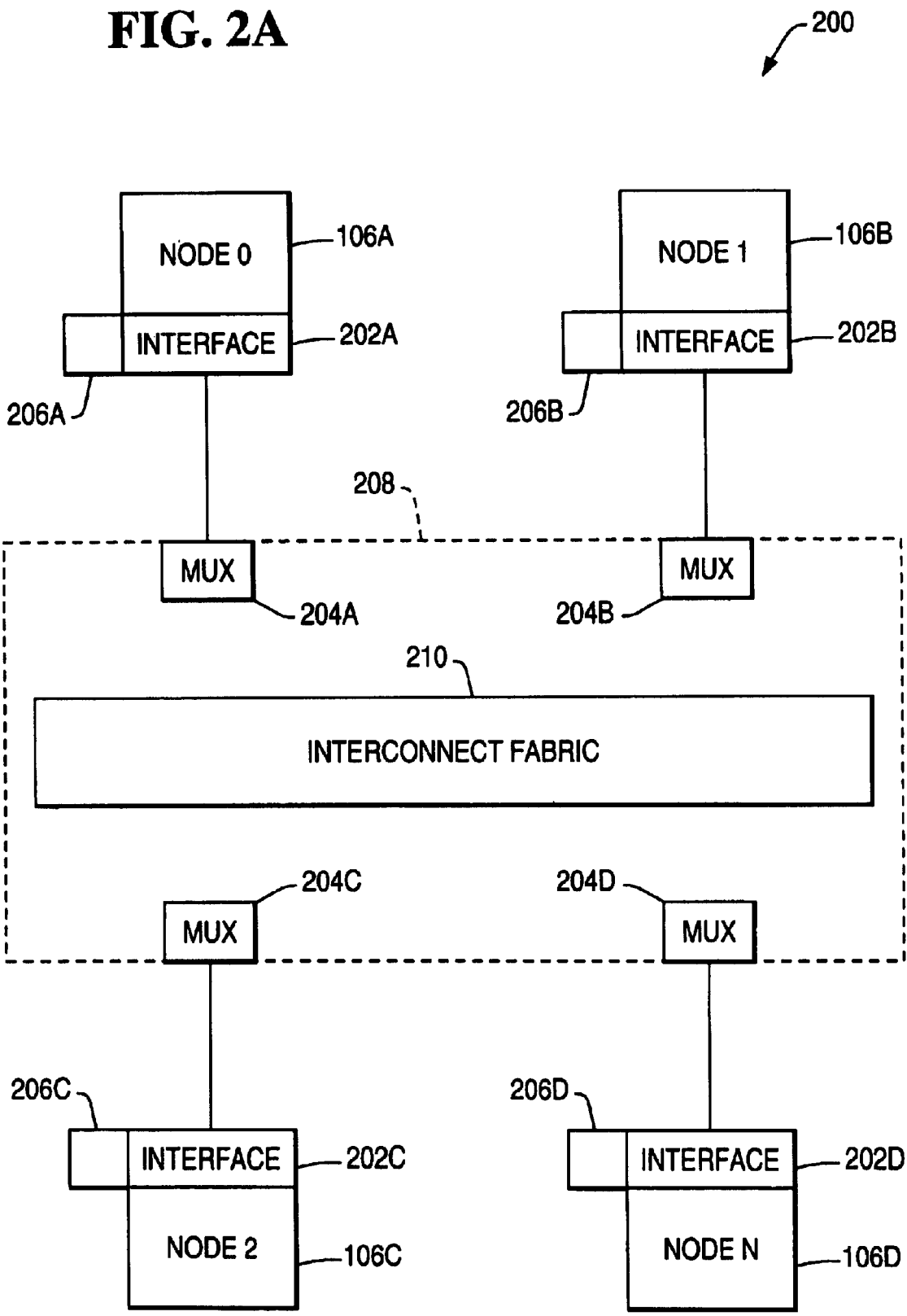
FIG. 2A is a block diagram of an exemplary hardware environment in which the present invention may be practiced.

In the following description, reference is made to the accompanying drawings which form a part hereof, and which is shown, by way of illustration, several embodiments of the present invention. It is understood that other embodiments may be utilized and structural changes may be made without departing from the scope of the present invention.

FIG. 1 is a diagram depicting a coordinator selection service 102 and a configuration selection service 104 used to configure the parallel processing system or trusted parallel application (TPA). Selecting a (TPA) coordinator 108 involves a SelectCoordinator service, wherein each of the nodes 106A–106D (collectively referred to hereinafter as nodes 106) casts a vote for a TPA coordinator 108 and compares votes from other participating nodes. If a TPA coordinator 108 has not been selected after a voting cycle, the participating nodes 106 vote again. This phase continues until all nodes 106 agree on a TPA coordinator 108, one node determines whom the TPA coordinator 108 should be, or until a timer expires. After being selected by this process, the TPA coordinator 108 starts the TPA selection phase. The non-coordinator nodes become passive and take their instructions from the coordinator.

Selecting the TPA involves the use of a SelectTPA service, which is executed on all nodes. However, only the TPA coordinator node 108 initiates any action. The TPA coordinator node 108 queries each node it can see that is expected to be in the TPA for the local configuration information describing the node's view of the system, builds a best TPA configuration from the received information, and distributes the final configuration information 110 to all participating nodes 106. The TPA coordinator 108 also instructs nodes to be excluded from the TPA to drop out. If a new node should try to join during this stage, the TPA coordinator 108 informs the requesting new node that it is too late to join. If a node should drop out for any reason during any phase of TPA configuration, the entire process restarts from the beginning. This is a function of the TPA reset and initialization layers.

From the viewpoint of the above configuration services, each of the nodes 106 are therefore classifiable as one of three types: (1) TPA coordinator node, (2) TPA non-coordinator node, and (3) non-TPA nodes. The TPA coordinator node 108 controls the TPA selection process. It queries each node 106 it can see, builds the final configuration information, and sends the final configuration information to the non-coordinator nodes. The TPA non-coordinator nodes (which are part of the TPA, but have not been selected as the coordinator node 108) are passive and wait for instructions from the TPA coordinator node 108. The TPA coordinator node 108 requests these nodes to send local data, receive final TPA information, or drop out of the TPA. Non-TPA nodes do not participate in the configuration process. The StartBynetRequest method of the two services responds appropriately when called to allow the TPA nodes to continue their configuration process.

FIG. 2A is a block diagram of an exemplary hardware environment 200 in which the present invention may be practiced. The hardware environment 200 comprises a plurality of nodes 106A–106D, each coupled by an interconnect system 208 having an interconnect fabric 210 via a node interface 202A–202D, respectively) and a multiplexer 204A–204D, respectively). The node interfaces 204A–204D) each communicate with a driver 206A–206D, respectively), which accept software commands. In one embodiment of the present invention, the interconnect system 208 is comprised of a BYNET network, and the drivers (206A–206D) are BYNET low latency interface (BLLI) drivers, which reduce transport latency.

Figure 2B:
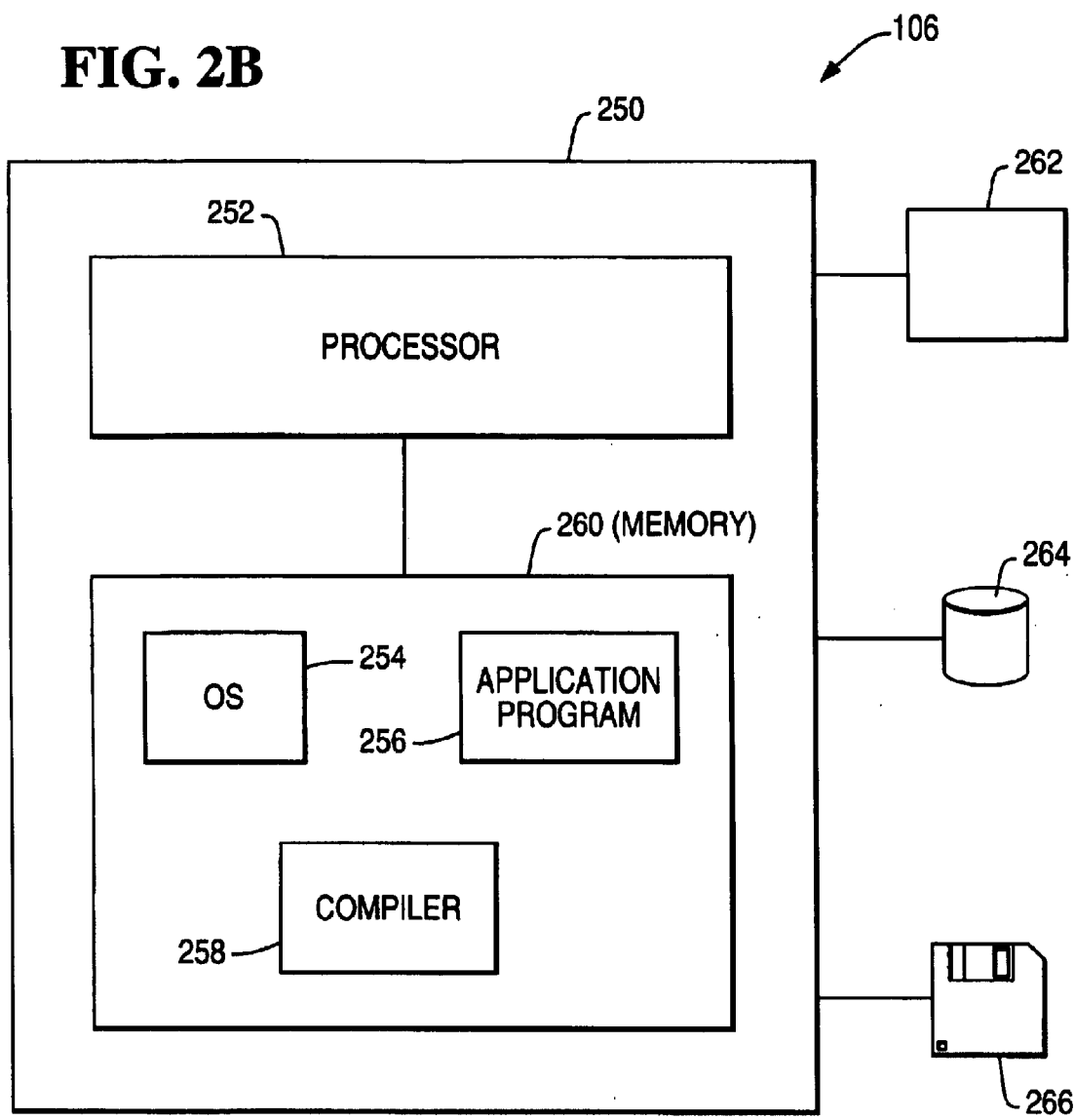
FIG. 2B illustrates an exemplary node that can be used to implement the present invention.

FIG. 2B illustrates an exemplary node 106 that could be used to implement the present invention. In one embodiment, the node 106 includes a computer 250 having a processor 252 and a memory 260, such as random access memory (RAM). The computer 250 may be operatively coupled to a display, which presents images such as windows to the user on a graphical user interface. The computer 250 may be coupled to other devices, such as a keyboard, a mouse device, a printer, etc. Of course, those skilled in the art will recognize that any combination of the above components, or any number of different components, peripherals, and other devices, may be used with the computer 250.

Generally, the computer 250 operates under control of an operating system 254 stored in the memory 260. In one embodiment, the computer 250 interfaces with the user to accept inputs and commands and to present results through a graphical user interface (GUI) module. The computer 250 also implements a compiler 258 which allows an application program 256 written in a programming language such as COBOL, C++, FORTRAN, or other language to be translated into processor 252 readable code. After completion, the application 256 accesses and manipulates data stored in the memory 260 of the computer 250 using the relationships and logic that were generated using the compiler 258. The computer 250 also optionally comprises an external communication device such as a modem, satellite link, Ethernet card, or other device for communicating with other computers.

In one embodiment, instructions implementing the operating system 254, the computer program 256, and the compiler 258 are tangibly embodied in a computer-readable medium, e.g., data storage device 264, which could include one or more fixed or removable data storage devices, such as a zip drive, floppy disc 266, hard drive, CD-ROM drive, tape drive, etc. In one embodiment of the present invention, the data storage device 264 also stores database information, which is accessed and processed by the application program 256. The operating system 254 and the computer program 256 are comprised of instructions which, when read and executed by the computer 250, causes the computer 250 to perform the steps necessary to implement and/or use the present invention. Computer program 256 and/or operating instructions may also be tangibly embodied in memory 260 and/or provided by data communications devices 262, thereby making a computer program product or article of manufacture according to the invention. As such, the terms "article of manufacture" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Figure 3A:
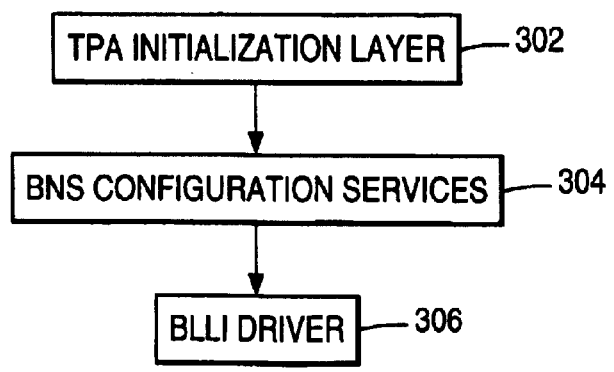
FIG. 3A is a diagram showing the relationship between major components of the parallel processing system startup process.

FIG. 3A is a diagram showing the relationship between the major components of the TPA startup process. The major components of the startup process include the TPA initialization layer 302. This component consists of the routines in a parallel database extension that starts the TPA initialization cycle.

Interface to TPA Initialization Layer

The routines shown in Table I below call the BNS configuration services 304 and return status and data responses to the TPA initialization layer 302.

TABLE I

| Routine Name | Description |
|---|---|
| tdnconfig | This is the only routine that is directly called by the TPA Initialization layer. Its purpose is to perform the SelectCoordinator and SelectTPA steps. |
| select_coordinator | This routine is used to execute the SelectCoordinator service. It is called by every node in the system that should join the TPA. The information passed to the service is: the desired node list, the number of nodes in the list, and the maximum time to wait for TPA selection. |
| select_tpa | This routine is used to execute the SelectTPA service. It is called by every node in the system that has completed the Select Coordinator phase. The SelectTPA service returns: a list of nodes that was selected for the TPA, the number of nodes in the list, this node's index into that list, and a flag indicating if this node is the coordinator. |
| start_tpa | This routine is called by a user when the user wants to avoid waiting the maximum configuration time because a node is known to be down. This call forces the coordinator node 108 to ignore its timers and continue with TPA selection. This call blocks until a coordinator node 108 is selected. |
| synchronize_tpa | This routine is called, after the system has been configured, to provide system-wide sync points. Each node in the TPA sends a request to the coordinator, and after the last node makes its request, the coordinator node 108 instructs all nodes to return to their caller. |

The TPA initialization layer component 302 interfaces directly with the BYNET network service (BNS) configuration services component 304. The BNS configuration service is the middle layer in PDE that interfaces with the TPA initialization layer 302 and the BLLI Driver 306. It also contains the BYNET service objects that control TPA selection. A list of BNS configuration services are presented in Table II below:

TABLE II

| BNS Configuration Service | Description |
|---|---|
| SelectCoordinator | A service used by all nodes to select the TPA coordinator node 108. Once the coordinator is selected, it controls the remainder of the configuration process and is responsible for selecting the TPA. |
| SelectTPA | A service used by all nodes in selecting the TPA configuration. The coordinator queries all other nodes for their view of the system, and after determining the best configuration, distributes the final TPA selection to those nodes. |
| SynchronizeTPA | A service used to synchronize TPA startup after the TPA configuration has been set. The coordinator records the sync requests issued from the other nodes, and after the last node sends its sync request, the coordinator instructs all TPA nodes to continue past the sync point. |

The BLLI driver 306 component is the software interface to the BYNET hardware. The above-described BNS Configuration services are described in greater detail in Appendix A.

Figure 3B:
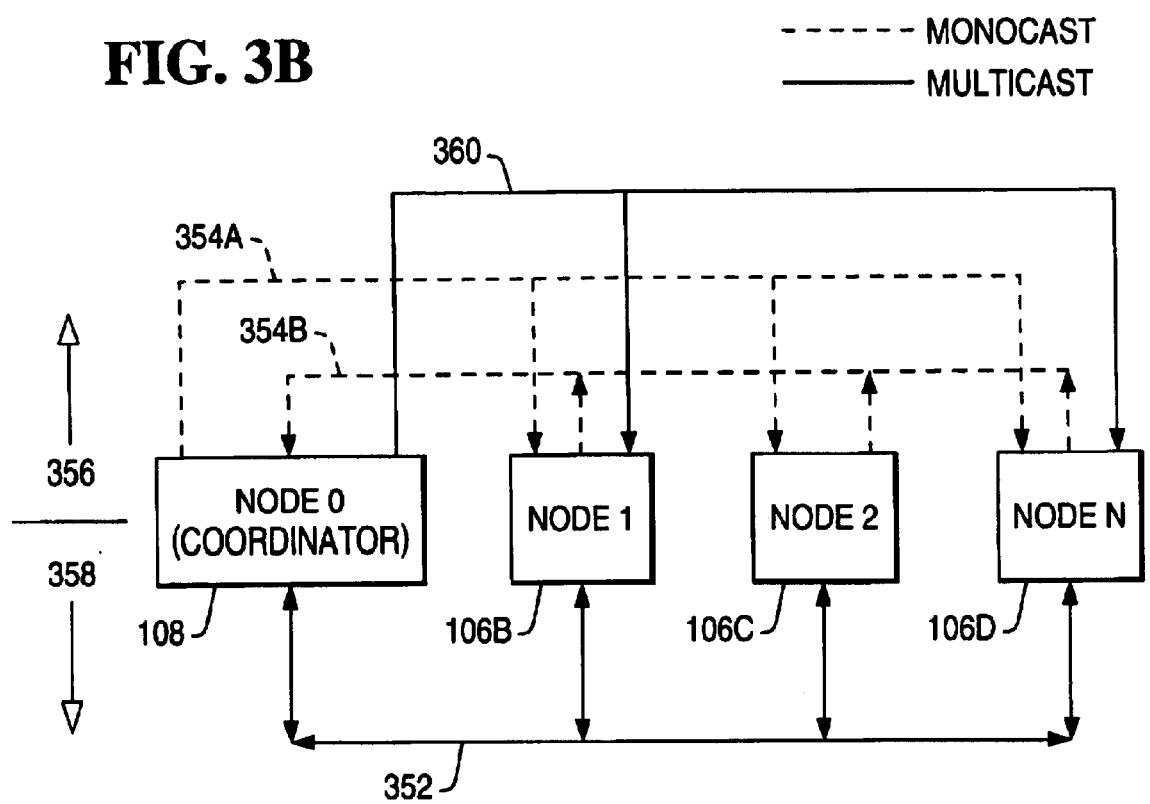
FIG. 3B is a diagram of message circuit types used for BNS configuration services.

FIG. 3B is a diagram showing the type of messaging circuits used for the BNS configuration services 304. For the SelectCoordinator service (indicated by 358 in FIG. 3B), all nodes 106 use a multicast circuit 352 to transmit information over the network during the voting phase. This information is received by all nodes (including the node originating the multicast message).

For the SelectTPA service (indicated by 356 in FIG. 3B), the TPA coordinator node 108 uses the multicast circuit 360 to request information from the other nodes 106. To accomplish this, the coordinator node 108 builds a broadcast SelectTPA service for all nodes 106 with the Request field set to SendTPAConfiguration. Non-coordinator nodes 106B–106D use a monocast circuit 354B to transmit their local information to the coordinator node 108. The coordinator node 108 also uses the multicast circuit 360 to distribute the final TPA configuration to all of the nodes. This is accomplished by building a multicast SelectTPA service for all member nodes (nodes in the final TPA list) with the Request field set to ReceiveTPAConfiguration. The SelectTPA service uses a monocast circuit 354A to instruct specific nodes to drop from the TPA configuration. This is accomplished by transmitting a monocast SelectTPA service with the Request field set to DropTPAConfiguration.

Figure 4:
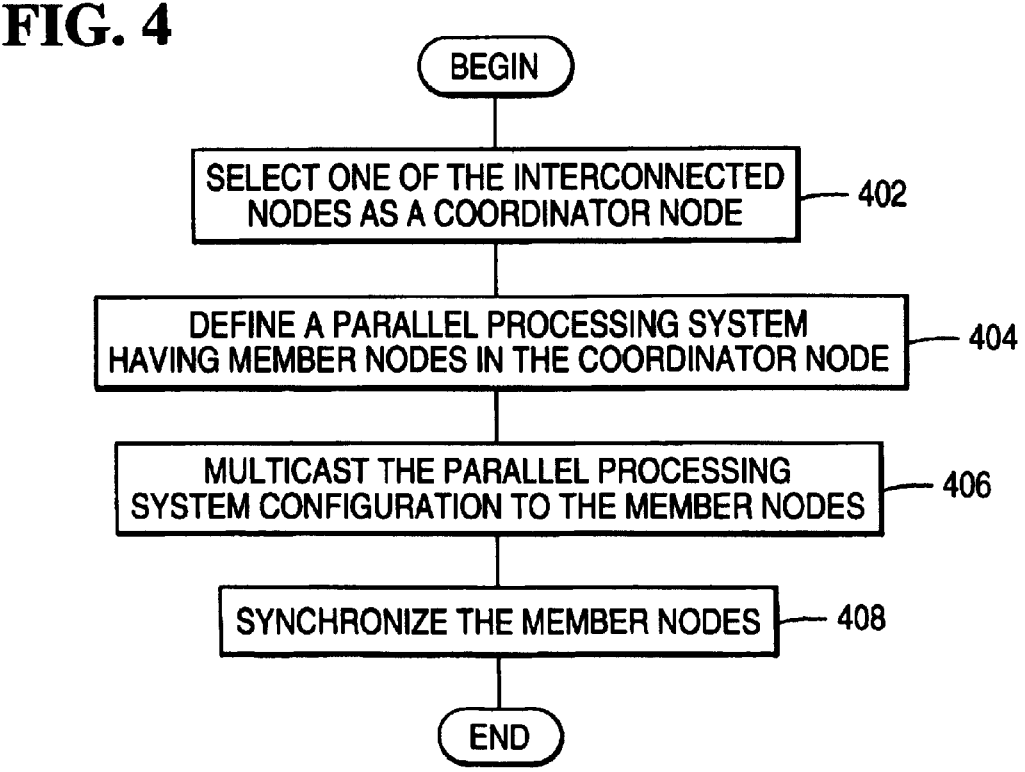
FIG. 4 is a flow chart illustrating exemplary process steps used to practice the present invention.

FIG. 4 is a flow chart illustrating exemplary process steps used to practice the present invention. One of the interconnected nodes 106 is selected as a coordinator node 108, as shown in block 402. The remaining nodes are non-coordinator nodes. Then, a parallel processing system having member nodes is defined by the coordinator node 108, as shown in block 404. The parallel processing system configuration is then multicast to the member nodes, as shown in block 406. The member nodes are then synchronized. This is illustrated in block 408.

Selecting a Coordinator

As described above, the TPA coordinator node 108 controls the TPA selection process. The coordinator node 108 queries each node 106 it can see, builds the final configuration information, and sends the final configuration information to the non-coordinator nodes. This is accomplished through a voting process involving all nodes 106 that should join the TPA. If it is possible to define a TPA configuration, one node is chosen as the TPA coordinator 108.

The process of selecting a coordinator node 108 is summarized as follows: the nodes 106 continuously vote for control until all expected TPA nodes have been seen by a node 106. If this does not occur, the coordinator node 108 is selected by a consensus of all of the inter-connected nodes 106.

Each of the nodes determines which nodes and nets it can see by using a bili$_{13}$ multicast_get routine on each net. The information is sent to every other node 106 for comparison. Each node 106 monitors its incoming data, compares the data to locally stored data, and chooses the best data for subsequent transmissions. This continues until a consensus as to the coordinator node 108 is reached, or until one node picks the coordinator node 108.

During the voting process, all participating nodes distribute and retain a best desired TPA list (m_pBestDesiredNodeList) and a best available TPA list (m_pBestNodeList) from all nodes.

The m_pBestNodeList is one with the following qualities (in order of precedence): (1) most number of nodes; (2) most number of nets.

The m_pBestDesiredNodeList is used to determine which nodes should be allowed in the TPA. A node 106 is excluded from the TPA (and hence, becomes a non-TPA node) if it is not in the m_pBestDesiredNode list.

The m_pBestNodeList is a subset of the m_pBestDesiredNodeList, and is used to determine the TPA coordinator node 108 and the final TPA configuration. The coordinator node 108 selects the TPA and distributes the final configuration to each TPA node.

Each node that is a member of the TPA returns the final TPA configuration to the tdnconfig caller.

Each node that is not a member of the TPA (a non-TPA node) returns an error message to its caller identifying the node as a non-participant. If a node is dropped from the TPA during the Select_tpa call, the returned TPA list will be invalid and the status returned indicates as such.

Figure 5:
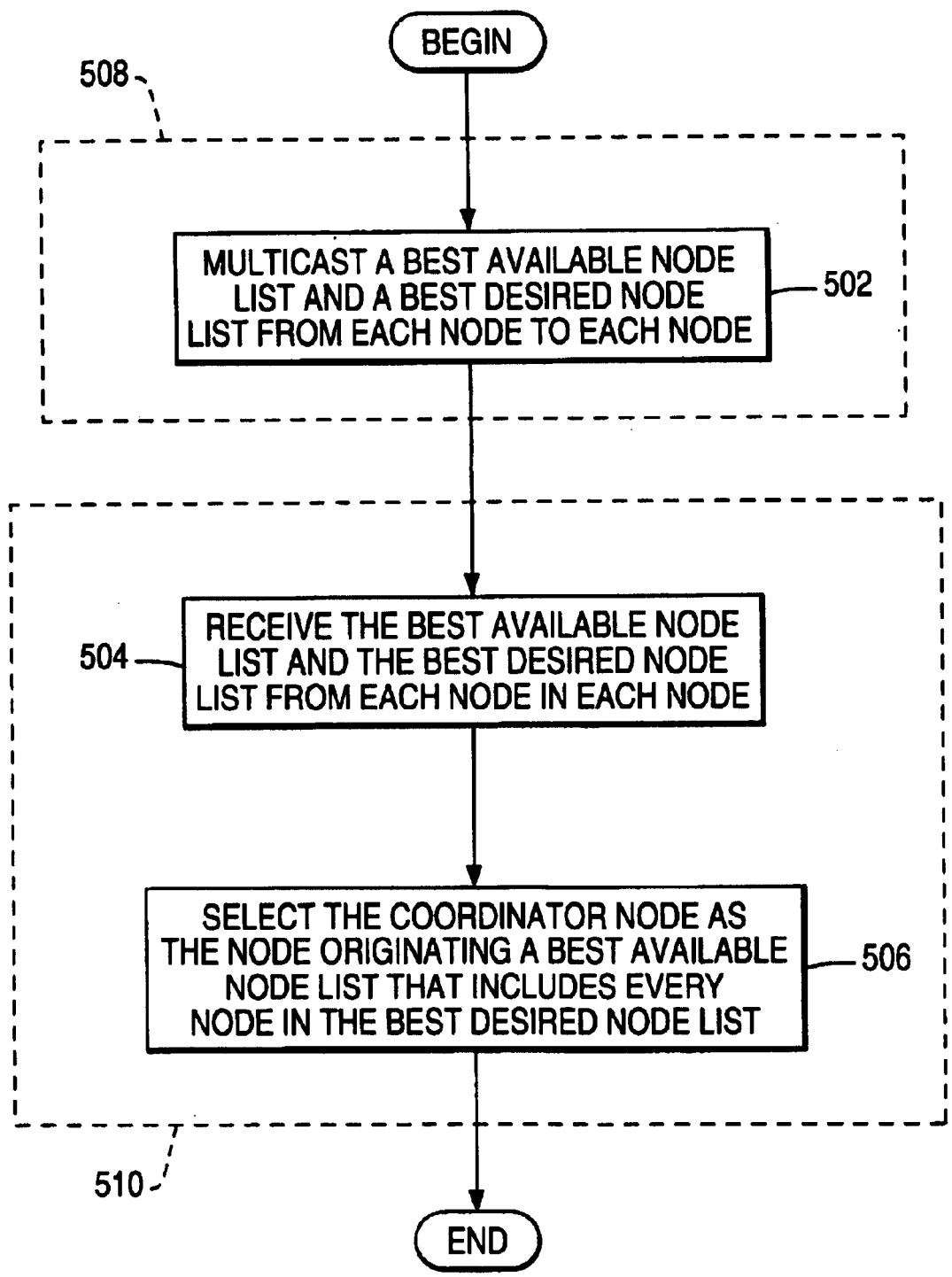
FIG. 5 is a flow chart presenting the method steps used in the hardware environment to select a coordinator node.

FIG. 5 is a flow chart presenting the method steps used in the hardware environment 200 to select a TPA coordinator node 108. A best available node list and a best desired node list are multicast from each node 106 to each node 106, as shown in block 502. The best available node lists and best desired node lists transmitted from each of the nodes 106 are then received by the other nodes, as shown in block 504. After the operations depicted in blocks 502 and 504 are complete, the coordinator node 108 is selected as the node originating the best available node list that includes every node in the desired node list. If no such node can be defined, the coordinator node is selected as the node originating a best available node list that includes the greatest number of nodes in the desired node list. If no single node with these characteristics can be defined, the coordinator node is selected according to which node can see the greatest number of nets. Finally, if no clear choice for the coordinator node 108 can be defined using the foregoing selection criteria, the coordinator node 108 is selected according to a default selection criteria such as a relationship between the node IDs for the participating nodes. For example, in one embodiment, the coordinator node 108 is selected as the node with the lowest ID.

The selected coordinator node 108 is the only node 106 to have one of the following characteristics (in order of precedence): (1) it can see the most number of nodes; (2) it can see the most number of nets; or (3) it is the lowest numbered node.

It is noted that the operations described in blocks 502 (denoted 508), and 504 and 506 (denoted 510) can occur in any order, and preferably occur asynchronously. That is, the receive operation can occur before, after, or during the send operation.

Figure 6B:
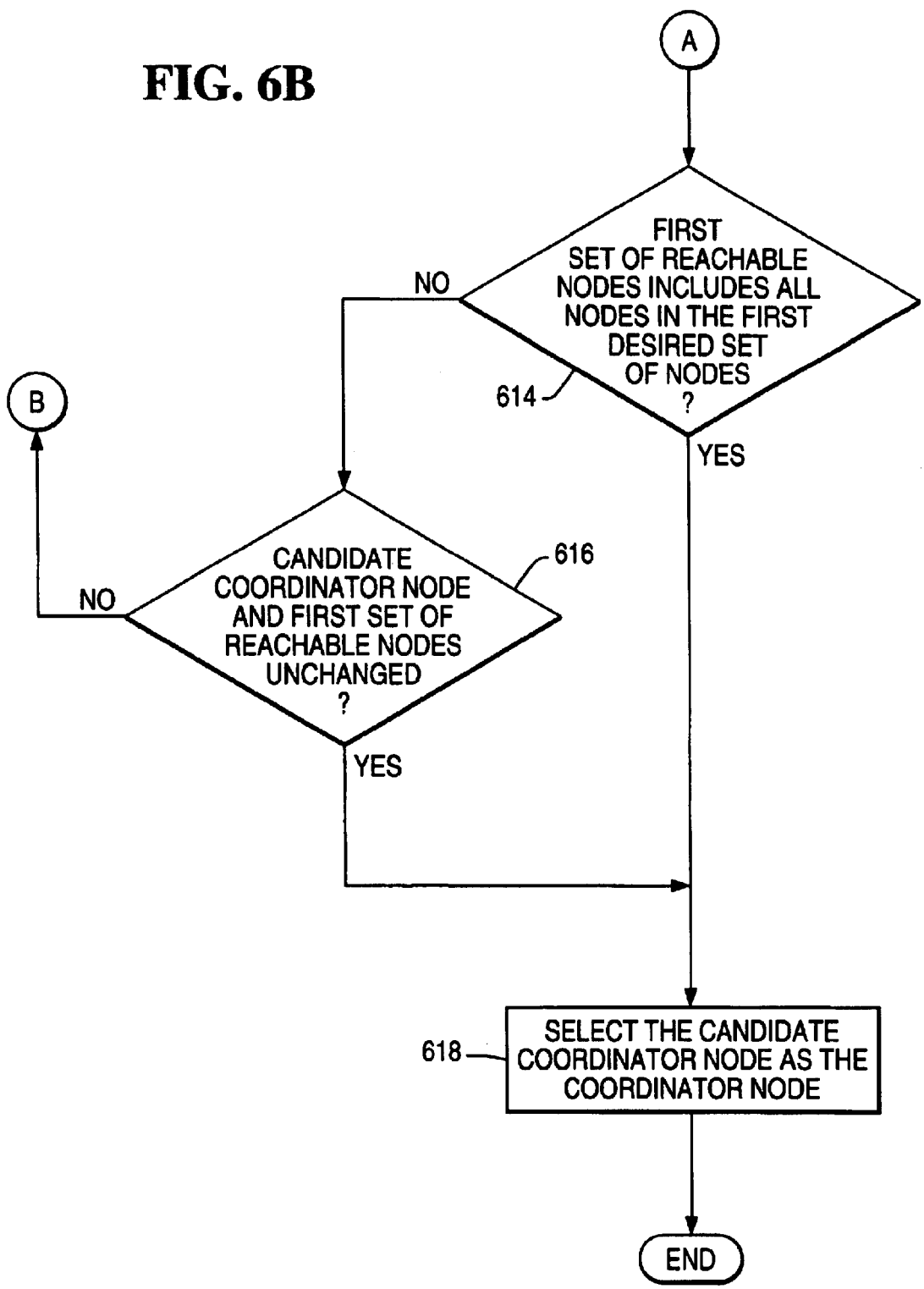

FIGS. 6A and 6B are flow charts showing the above operations in additional detail, and from the perspective of a single node (hereinafter "local node") communicating with other nodes on the network (hereinafter "remote nodes"), rather than the system perspective described and shown in FIG. 5.

Turning to FIG. 6A, a first set of desired nodes and a first set of reachable nodes are multicast from the local node to the remote nodes, as shown in block 602. The local node receives a remote set of desired nodes and a remote set of reachable nodes from a remote node, as shown in step 604. Generally, steps 602 and 604 occur asynchronously. That is, the local node information can be broadcast before or after the information is received from the remote nodes, and the transfer of information from any particular node 106 to another node can occur in any order. When the local node receives each remote set of desired nodes and remote set of reachable nodes from each remote node in the network, they are compared to the locally-stored versions of the same lists. If the remote set of desired nodes from a remote node has more members than the first set of desired nodes (indicating that the remote node requires access to more nodes than the local node), the node list which originally comprised the first set of desired nodes is replaced with the remote set of desired nodes. If the set of nodes required by the remote node is not greater than the nodes required by the local node, the first set of desired nodes remains unchanged. This is depicted in block 606.

Similarly, the first set of reachable nodes is set to the remote set of reachable nodes if the remote set of reachable nodes has more members than the first set of reachable nodes, as shown in block 608. Hence, if the remote node can reach more nodes than the local node, the nodes listed in the remote node's reachable node set replaces the list of reachable nodes stored in the local node.

If data from all participating nodes has not been received 610, the process continues, with remote node information replacing the information in the first set of desired node and the first set of reachable node lists. When data from all participating nodes has been received, the local node has a local copy indicating which node can reach the greatest number of nodes on the network, and what those nodes are. The local node also has a local copy indicating which node requires the greatest number of nodes, and a list of those nodes. After all of the data from all participating remote nodes has been received, a candidate coordinator node is selected as the node originating the first set of reachable nodes, as shown in block 612. If the first set of reachable nodes includes all the nodes in the first desired set of nodes, a suitable coordinator node has been found, and the candidate coordinator node is selected as the coordinator node 108, as shown in blocks 614 and 618. If not, the local node again multicasts its locally stored set of desired nodes and first set of reachable nodes across the network to the remote nodes, receives similarly multicast data from the remote nodes, and the steps outlined in blocks 604–614 are repeated until the identity of the candidate coordinator node and the members of the first set of reachable nodes is unchanged from the previous iteration. At this time, the current candidate coordinator node is selected as the coordinator node, as shown in blocks 616 and 618. The operations denoted by 620 and 622 are asynchronous. That is, the operations within 620 can occur before, after, or at the same time as the operations denoted by 622.

Figure 7A:
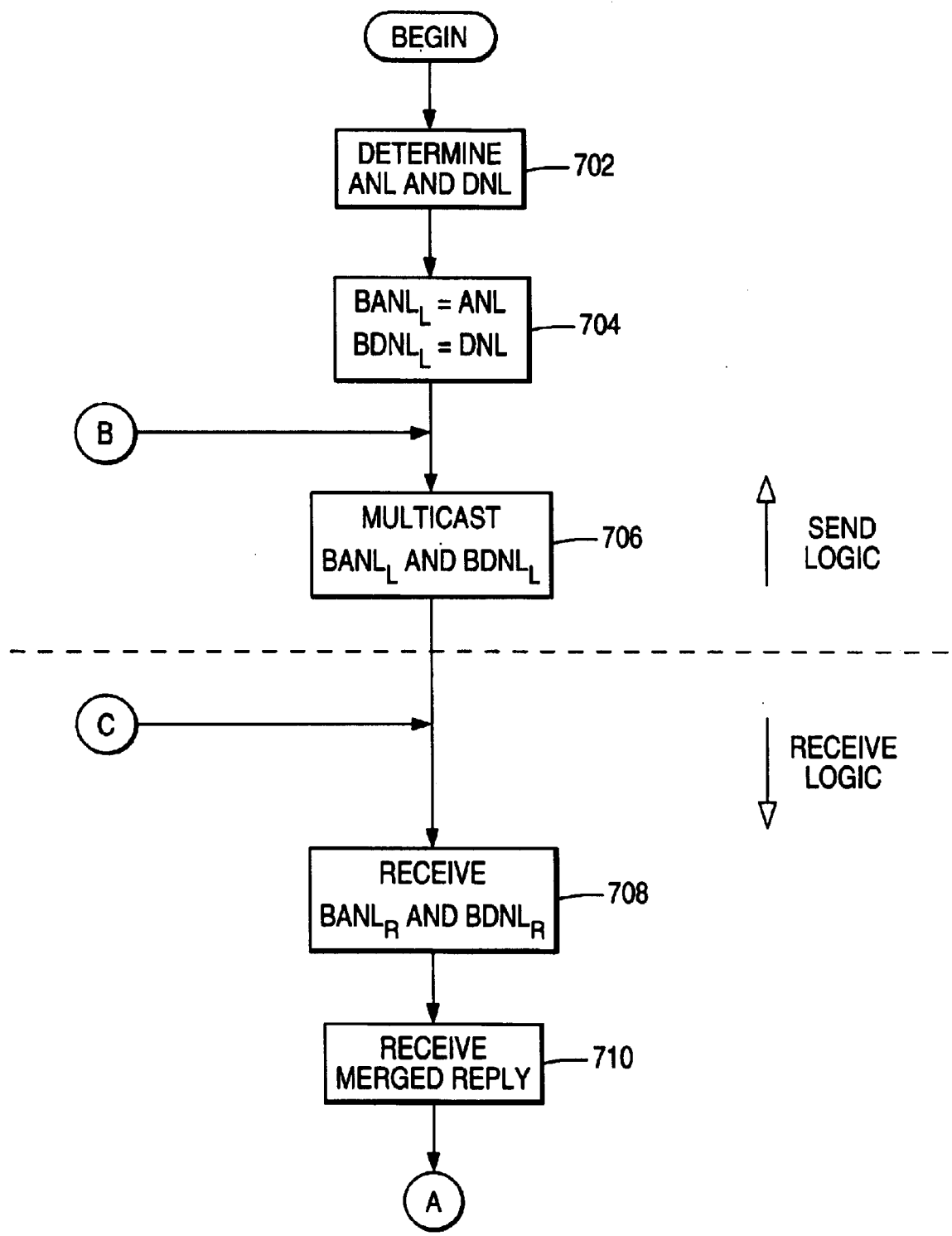
FIGS. 7A–7C are flow charts presenting further details regarding the selection of the coordinator node.
Figure 7B:
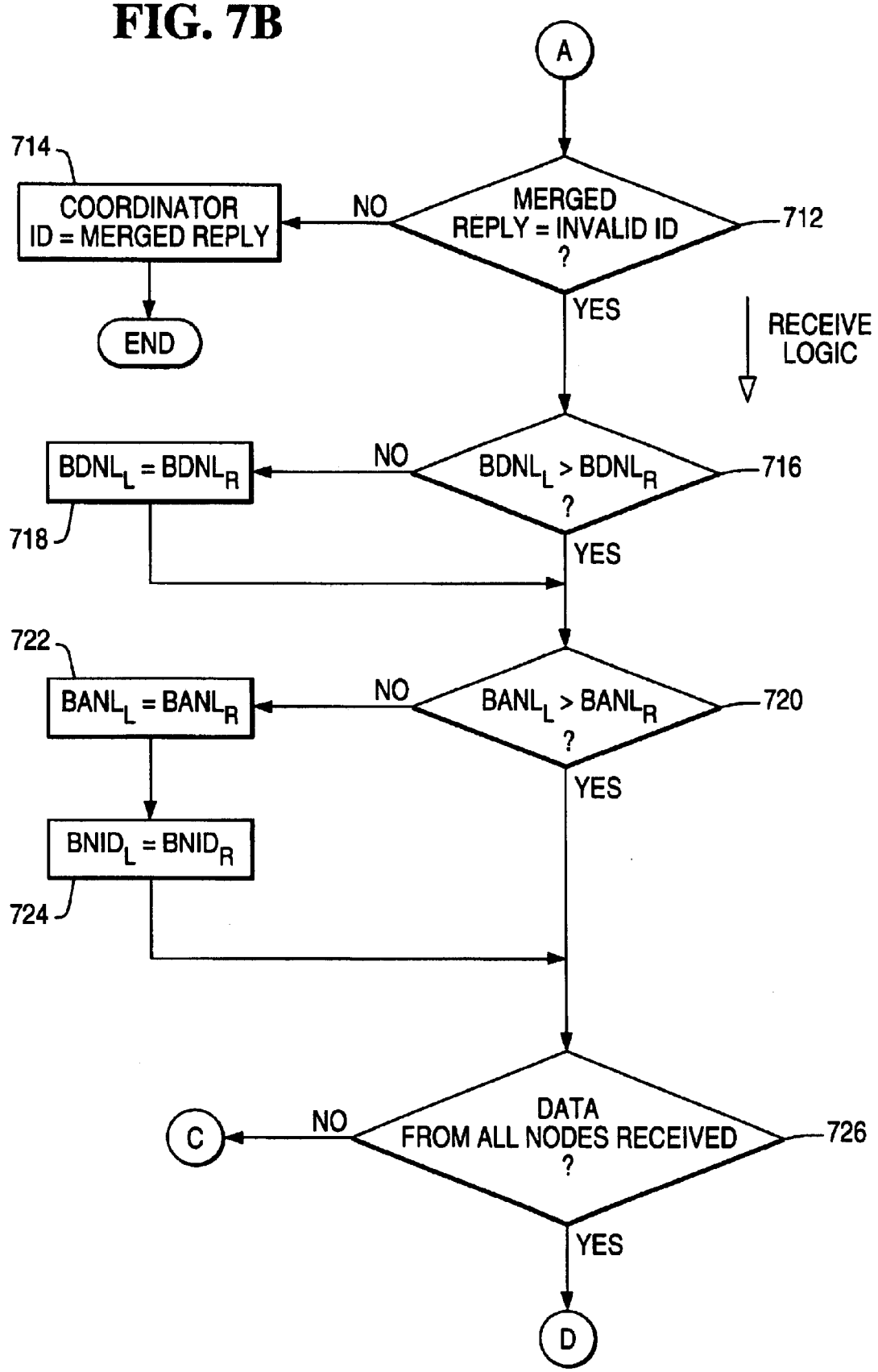
Figure 7C:
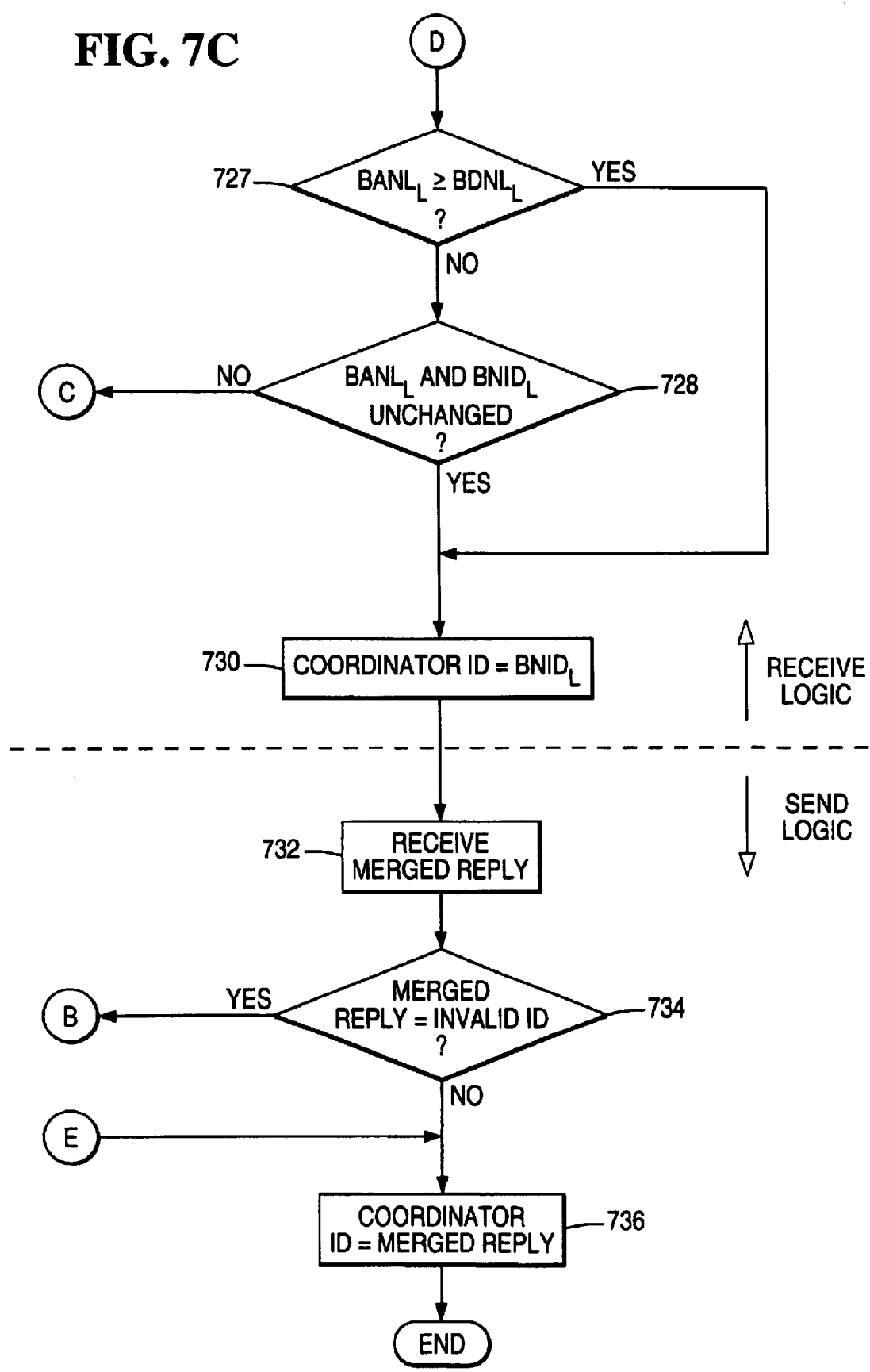

FIGS. 7A–7C present one embodiment of the present invention showing the operations depicted in FIGS. 6A–6B in greater detail. FIGS. 7A–7C collectively depict operations that are preferably performed by a send process (denoted in FIGS. 7A–7C "send logic") and a receive process (denoted FIGS. 7A–7C as "receive logic") operating asynchronously. It is to be understood that the foregoing operations are described in terms of a single flow only for purposes of illustration and description. The send logic and receive logic so depicted are preferably implemented in a plurality of separate, asynchronous processes.

The process begins when a local node calls a StartOSRequest method. The StartOSRequest method examines the TPAConfig object to determine if a coordinator node 108 has already been selected, as is indicated when the m_nCoordinatorNodeID field contains a valid node 106 ID. If a coordinator node 108 has been selected, processing logic simply returns. A return status is provided which may indicate that the local node is a late-joiner if it is not listed in the TPA configuration.

A list of nodes 106 that are accessible to the local node (accessible node list, ANL) and a list of nodes that are desired by the node (desired node list, DNL) are then determined, as shown in block 702. This is accomplished by issuing a bili_multicast_get command to the BLLI driver 206. A best available node list (m_pBestNodeList) and a best desired node list (m_pBestDesiredNode List) stored locally at the node is then initialized with the node's data (ANL and DNL, respectively), as shown in block 704. Next, process logic waits until all desired nodes are active, or until the timer expires. Then, a list of nets needed to reach all desired nodes is obtained. Each net in the list is used when casting a vote.

If a coordinator has not been selected, the n_pBestNodeList and m_pBestDesiredNodeList lists are multicasted by the local node on each net that contains a different set of nodes. This is shown in block 706. To avoid flooding the network with large bursts of multicasts, a small delay may be maintained between each transmission.

In one embodiment of the present invention, the driver 206 is a BLLI driver 206, which is incapable of supporting multicasts directly to a specific net. However, the BLLI driver 206 guarantees to deliver packets to every node 106 on a net if those nodes are in the same multicast target group. In this embodiment, the procedure used to simulate a net-specific multicast is to (1) acquire the node list for a net by using bili_multicast get( ) command; (2) create a multicast target group for those nodes in the node list by using bili_multicast_create( ); and (3) use the target group_id returned from the previous step for the broadcast. In this embodiment, the BLLI driver 206 only guarantees that the target group will receive the data. It does not guarantee to broadcast on any specific net, nor to exclude other nodes 106 from receiving the data. The actual nodes 106 to receive the data may be a superset of the target group.

Returning to FIG. 7A, the local node receives a best available node list and a best desired node list (denoted BANL$_R$ and BDNL$_R$, respectively) from one of the remote nodes, and invokes the StartBynetRequest method. This is depicted in FIG. 7A.

The StartBynetRequest method then examines the TPAConfig object again to determine if the TPA has already been configured. If so, the data sent by the node is it-bucketed and a late-joiner status is returned. If the sending node is not a late joiner, the TPAConfig object is examined to determine if a coordinator node 108 has already been selected. If it has, the sent data is bit-bucketed and the coordinator node 108 ID is returned. If not and the local node is participating in the voting process (SOR started), the local node returns a "coordinator unknown" message.

In one embodiment of the present invention, this is accomplished by replying with an InvalidID (which is nominally a FFFF$_{HEX}$ value). The receiver node also replies with an InvalidID if it is not participating in the vote.

Replies from the nodes 106 are combined to generate a merged reply, from which each node can determine if a node 106 has been selected as the coordinator node 108. In an embodiment described above, in which the Invalid ID indicates that the local node has no preference for a coordinator node 108, the merged reply is a low-sorted list of all of the replies for each of the remote nodes. Since the InvalidID is the highest possible value (FFFF$_{HEX}$), the first value in the low sorted list includes an InvalidID if no coordinator node 108 has been chosen. If a coordinator node is chosen, its node ID will be smaller than the InvalidIDs, and hence, will be first in the merged reply.

The local node receives the merged reply and invokes the CompleteBynetRequest method. The merged reply is examined for late-joiner or "no memory available" status. This is illustrated in block 710. If the merged reply does not indicate a late-joiner or "no memory available" status, and the reply includes an InvalidID, the merged reply is saved in m_nCoordinatorNodeID.

If the merged reply includes valid ID for a node 106, it indicates that one of the nodes 106 has voted to be the coordinator node 108. In this case, the local node sets the coordinator's node ID (m_nCoordinatorNodeID) to the merged reply (which has the valid ID from the node). This is illustrated in blocks 712 and 714.

If the merged reply includes an InvalidID, the best desired node list (m_pBestDesiredNodeList) received from the remote node (BDNL$_R$) is compared to the current (locally stored) best desired node list, and updated if the received list BDNL$_R$) describes a better TPA than the current list (BDNL$_L$). This is determined, in order of precedence, by which list includes the greatest number of nodes, and which list includes the greatest number of nets. This is illustrated in blocks 716 and 718 of FIG. 7B. Also, the best available node list (m_pBestNodeList) received from the remote node (BANL$_R$) is compared to the current (locally-stored) best available node list (BANL$_L$). The received list (BANL$_R$) is saved as the mpBestNodeList if it describes a better TPA. This is shown in blocks 720 and 722. Finally, if the local node has cast at least one vote, the node ID of the node originating the best available node list (BANL$_L$) is catalogued. The foregoing steps are repeated until the local node receives and analyzes lists from each of the remote nodes, as shown in block 726.

If, after all of the data from the remote nodes is received, the first set of reachable nodes (m_pBestNodeList, or BANL$_L$ in FIGS. 7A–7C) includes every node in the desired set of nodes (m_pBestDesiredNodeList, or BDNL$_L$ in FIGS. 7A–7C), the local node sets the coordinator ID (m_nCoordinatorNodeID) to the node ID for the node originating the current first set of reachable nodes (indicated as $BNID_L$ in FIG. 7C). This is illustrated in blocks 727 and 730.

If, after all of the data from the remote nodes is received, the first set of reachable nodes does not include every node in the desired set of nodes, the logic depicted in block 728 determines if the first set of reachable nodes (m_pBestNodeList) and the node ID for the node originating the first set of reachable nodes ($BANL_L$ and $BNID_L$, respectively) has changed from the previous iteration. If they have changed, it indicates that the voting process has not been completed, or that a new node has entered the voting process, and the logic is returned to block 708. If they have not changed, it indicates that all of the nodes have reported in with the same data, and that it is time to select a coordinator node 108, even if none of the nodes examined satisfy the logical condition of block 727. In this case, the coordinator ID is set to $BNID_L$, which represents the node ID of the node that originated the m_pBestNodeList. The nodes required to have the same m_pBestNodeList are the nodes in that list.

The local node then receives the merged reply, as shown in block 732, and invokes the CompleteOSRequest method. The CompleteOSRequest method examines the merged reply valid node id, as shown in block 734. The SelectCoordinator service is restarted if the merged reply is an InvalidID, indicating that a coordinator node 108 has not been selected. If the merged reply is not an InvalidID, indicating that a coordinator node 108 has been selected, the local node verifies that the node associated with the node ID indicated in the merged reply is not a late joiner nor a non-TPA node, and sets the coordinator ID (m_nCoordinatorNodeID) to the merged reply, and returns the coordinator ID to the caller of the SelectCoordinator service. A node is a late joiner if the voting nodes exclude it from the TPA, or if the node has not joined by the time the coordinator 108 queries it for its TPAConfig information. A node has joined if it has started this service and it is in the coordinator node's m_pBestNodeList.

When the foregoing logical operations are completed, a TPA coordinator node 108 is selected.

Figure 8:
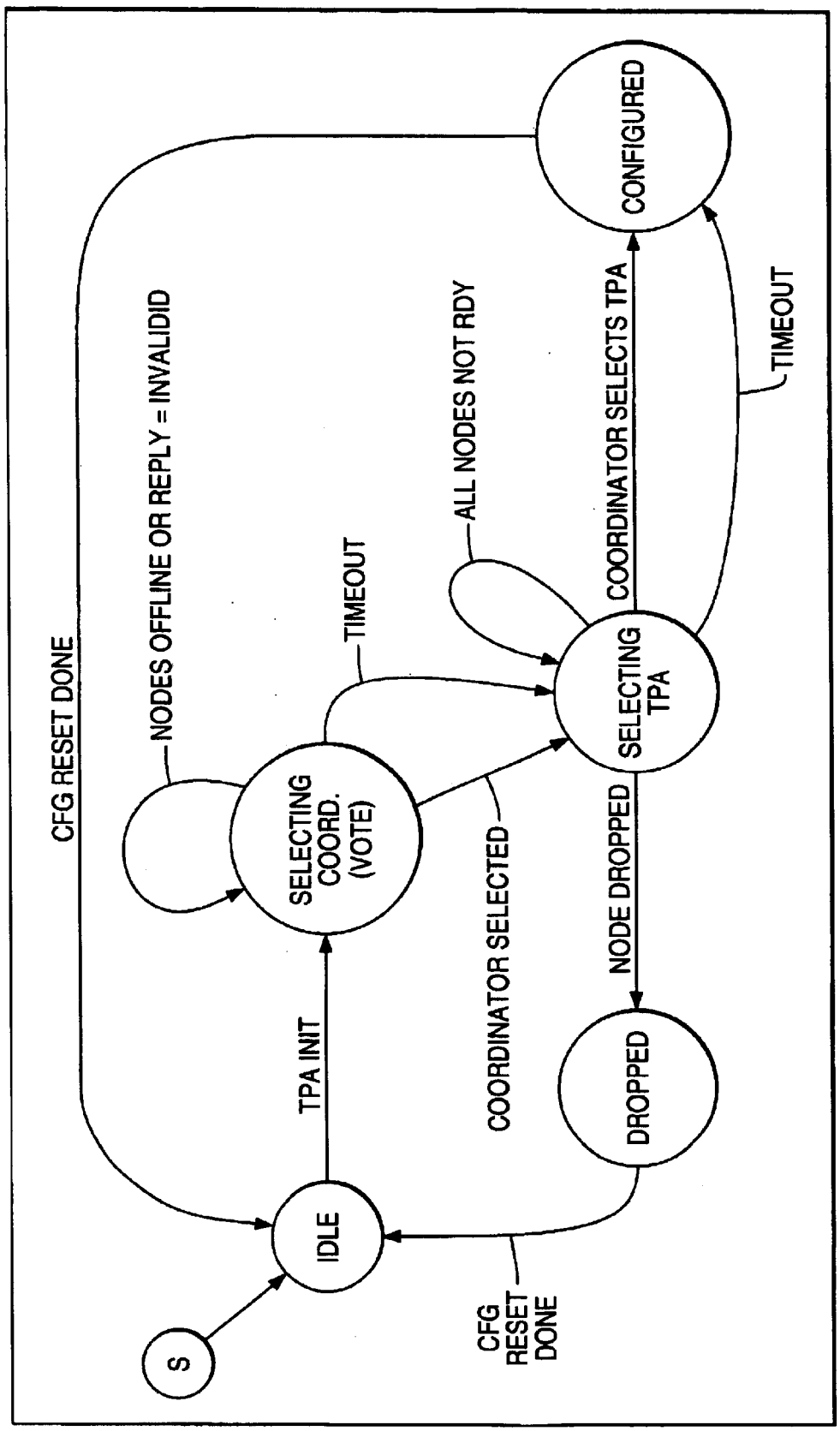
FIGS. 8 and 9 are state transition diagrams illustrating the selection of the coordinator node.
Figure 9:
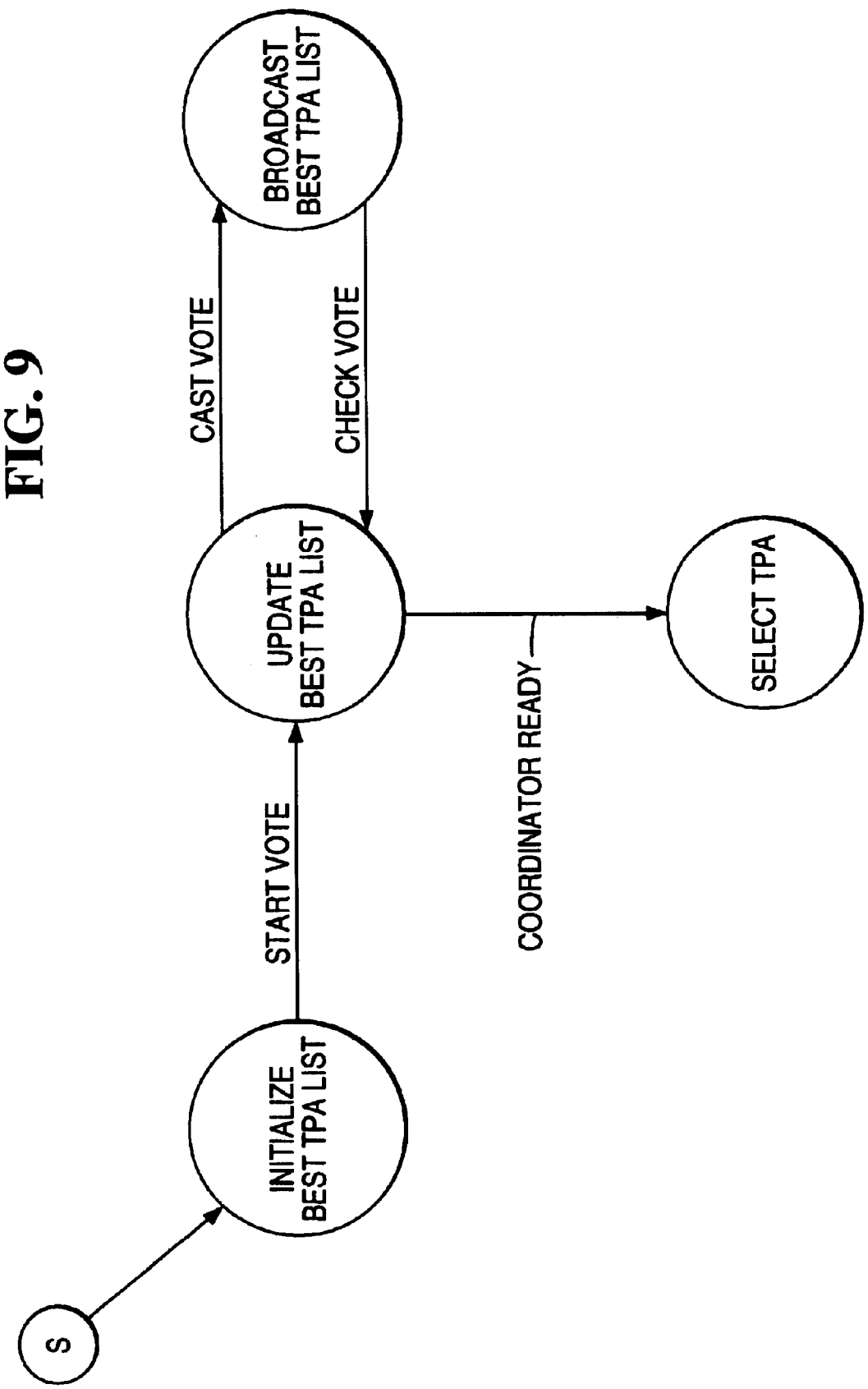

FIGS. 8 and 9 are state transition diagrams illustrating the foregoing logical operations in state transition form.

Table III below presents an example of what is distributed between four nodes of an eight-node system during the first two vote cycles. In this example the TPA is initially defined as a four node system, and is upgraded to eight nodes. For simplicity sake it is assumed that all nodes distributed their data during the vote, and the "Best" columns show what was distributed.

TABLE III

| Node | Desired Nodes | Available Nodes | Best Desired TPA | Best Available TPA |
|---|---|---|---|---|
| A | 8 Nodes | 4 Nodes | 8 Nodes | 4 Nodes |
| B | 4 Nodes | 8 Nodes | 4 Nodes | 4 Nodes |
| C | 4 Nodes | 2 Nodes | 4 Nodes | 2 Nodes |
| D | 4 Nodes | 6 Nodes | 4 Nodes | 4 Nodes |

As shown in Table III, the process begins with node A desiring 8 nodes, and having 4 nodes available. Conversely, Node B requires only 4 nodes, but has access to 8 nodes. Node C requires 4 nodes, and has access to only 2 nodes, while node D requires 4 nodes, but has access to 6 nodes. As described above, each node transmits its desired node list and its available node list to the other nodes. Therefore, node A broadcasts a list with 8 nodes, and nodes B–D broadcast a list with 4 nodes. Also, the best available TPA list represents the nodes available to each node, but is a subset of the desired nodes. Hence, nodes A, B, and D broadcast a best available node list with 4 nodes, and node C broadcasts a list with 2 nodes.

At the next iteration, all of the nodes A–D receive the information broadcast by all the other nodes, compare that information with the locally stored information (represented by columns 2 and 3), and update the best desired and best available lists. Since the best desired list originated with node A and had 8 nodes, nodes B–D replace their best desired list with the list obtained from node A. Hence, each of the nodes A–D have 8 nodes in their locally stored best desired node list.

Each of the nodes A–D also examine their locally stored best available node list and compare it with the best available node list received from the other nodes. If the locally stored list has fewer nodes than the one received from the remote nodes, the best available node list is set to the list received from the remote node. Hence, the best available node list for node A remains the same, and increases from 2 to 4 for node C. If the locally stored list has more nodes than the one received from the remote node, the best available node list is updated with the locally stored version. Hence, the best available node list for node B increases to include 8 nodes, and for node D, increases to include 6 nodes. This is shown in Table IV below:

TABLE IV

| Node | Desired Nodes | Available Nodes | Best Desired TPA | Best Available TPA |
|---|---|---|---|---|
| A | 8 Nodes | 4 Nodes | 8 Nodes | 4 Nodes |
| B | 4 Nodes | 8 Nodes | 8 Nodes | 8 Nodes |
| C | 4 Nodes | 2 Nodes | 8 Nodes | 4 Nodes |
| D | 4 Nodes | 6 Nodes | 8 Nodes | 6 Nodes |

The four nodes in this example reach a consensus after three cycles. The voting in this case ceases, and node B is selected as the coordinator node 108. That is because node B's best available node list includes all nodes in the (now global) best desired node list. When the process is completed, each node stores information as depicted in Table V below:

TABLE V

| Node | Desired Nodes | Available Nodes | Best Desired TPA | Best Available TPA |
|---|---|---|---|---|
| A | 8 Nodes | 4 Nodes | 8 Nodes | 8 Nodes |
| B | 4 Nodes | 8 Nodes | 8 Nodes | 8 Nodes |
| C | 4 Nodes | 2 Nodes | 8 Nodes | 8 Nodes |
| D | 4 Nodes | 6 Nodes | 8 Nodes | 8 Nodes |

The foregoing process has been described with respect to a local node communicating with one or more remote nodes. It should be noted, however, that the foregoing steps are taking place asynchronously in all nodes 106 that are candidates to become the coordinating node 108.

Selecting the Parallel Processing Configuration

The SelectTPA service is used to build the final parallel processing configuration. This is accomplished by building a TPA configuration table and sending it to each node 106 that is a member of the configured TPA. The process involves the coordinator node 108 requesting all nodes 106 to send their view of the system. The coordinator node 108 then decides on the best TPA configuration, and broadcasts information regarding the best TPA configuration to every other node 106.

Figure 10:
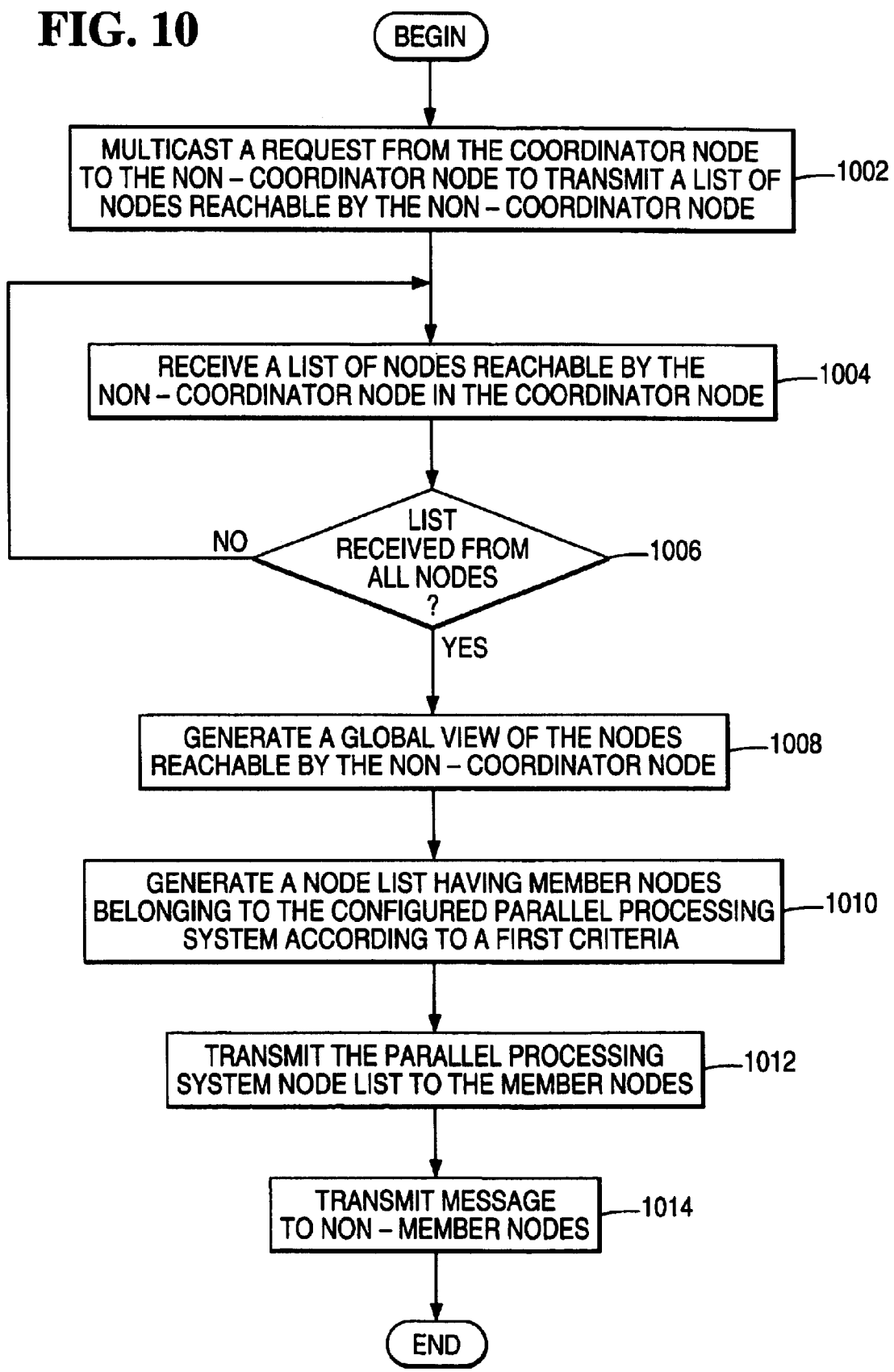
FIG. 10 is a flow chart illustrating one embodiment of the process steps used to select the parallel processing configuration.

FIG. 10 is a flow chart illustrating one embodiment of the process steps used to select the parallel processing configuration. First, a request from the coordinator node 108 is multicast to each of the non-coordinator nodes 106. In response, each of the non-coordinator nodes 106 transmits a list of nodes that is reachable from the non-coordinator node. This is illustrated in block 1002. The list transmitted by the non-coordinator nodes 106 is received by the coordinator node 108, as shown in block 1004. The foregoing steps are repeated for each of the non-coordinator nodes 106 until all of the non-coordinator nodes 106 have transmitted the list of nodes reachable by that respective node. Although not necessary to practice the present invention, the list of nodes from each non-coordinator node arrives synchronously from that of the other nodes. If necessary, a delay can be implemented so as to prevent all of the nodes from responding at the same time.

Next, a global view of the nodes reachable by the non-coordinator node 106 and the coordinator node 108 is generated. Then, a node list is generated in accordance with a first criteria. The node list includes member nodes belonging to the configured parallel processing system. In one embodiment of the invention, the first criteria is such that the configured parallel processing system includes the maximum number of reachable nodes. If more than one possible configuration includes this maximum number of nodes (that is, more than one possible configuration meets the maximum reachable node criteria), a secondary criteria is applied. In this secondary criteria, the configured parallel processing system is selected from among those with the maximum number of nodes as the system with access to the greatest number of networks is selected. This is illustrated by blocks 1008 and 1010.

The parallel processing system node list generated above is then transmitted 1012 to the member nodes, that is, those nodes 106 which are in the configured parallel processing system, and are listed in the parallel processing system node list.

Figure 11:
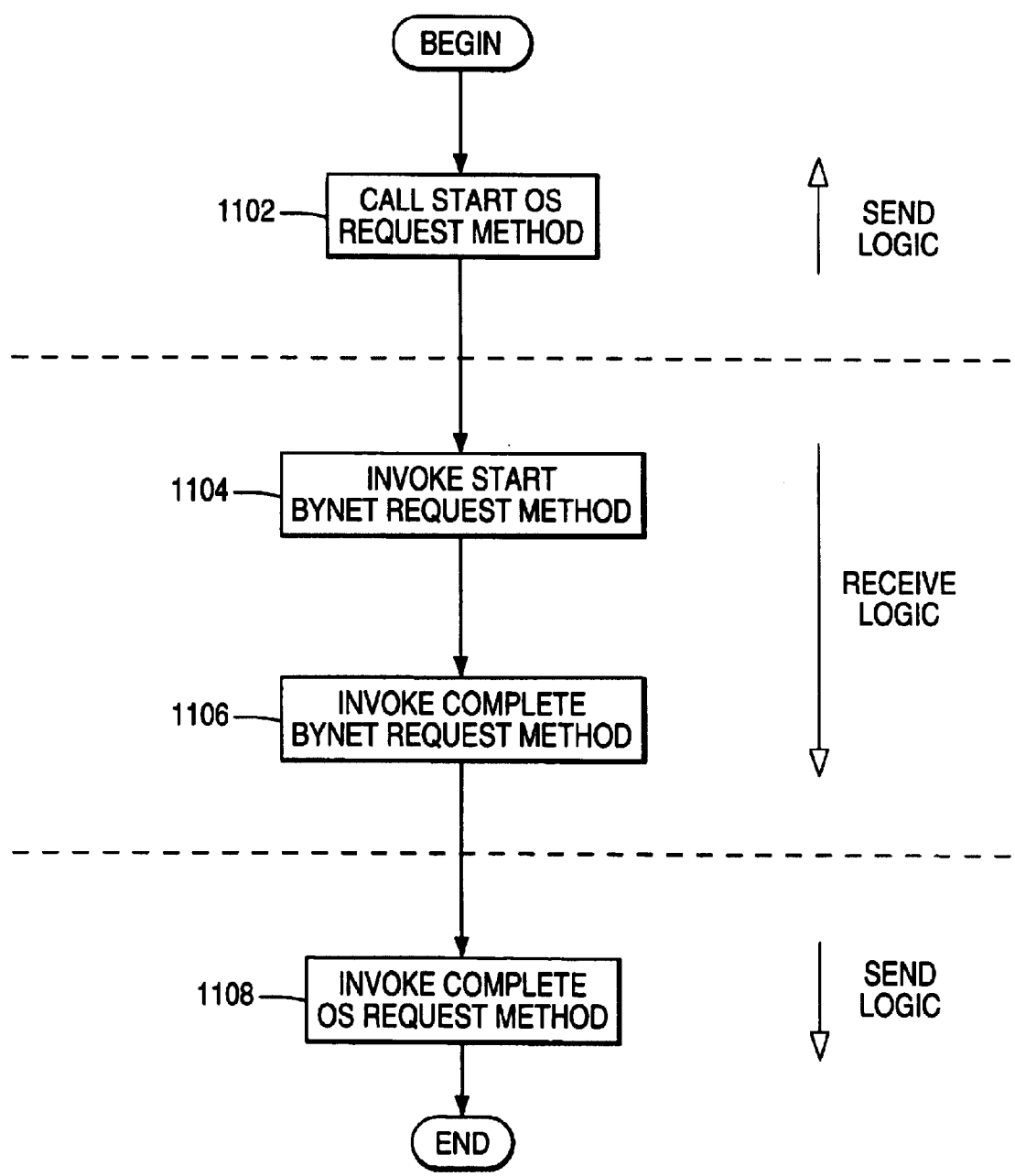
FIG. 11 is a diagram illustrating the process steps performed by the nodes in selecting the parallel processing configuration.

FIG. 11 is a diagram illustrating the process steps performed by the nodes 106 in selecting the parallel processing configuration. In the send logic, a node 106 calls an OSRequest method, as shown in block 1102. In the receive logic, a node then invokes a StartBynetRequest method, and a CompleteBynetRequest method. In the send logic, the sending node then invokes a CompleteOSRequest method, as shown in blocks 1104–1108. The CompleteBynetRequest method and the CompleteOSRequest method can be performed in any order or at the same time, while the StartBynetRequest method must run before the CompleteBynetRequest and the CompleteOSRequest methods.

Figure 12A:
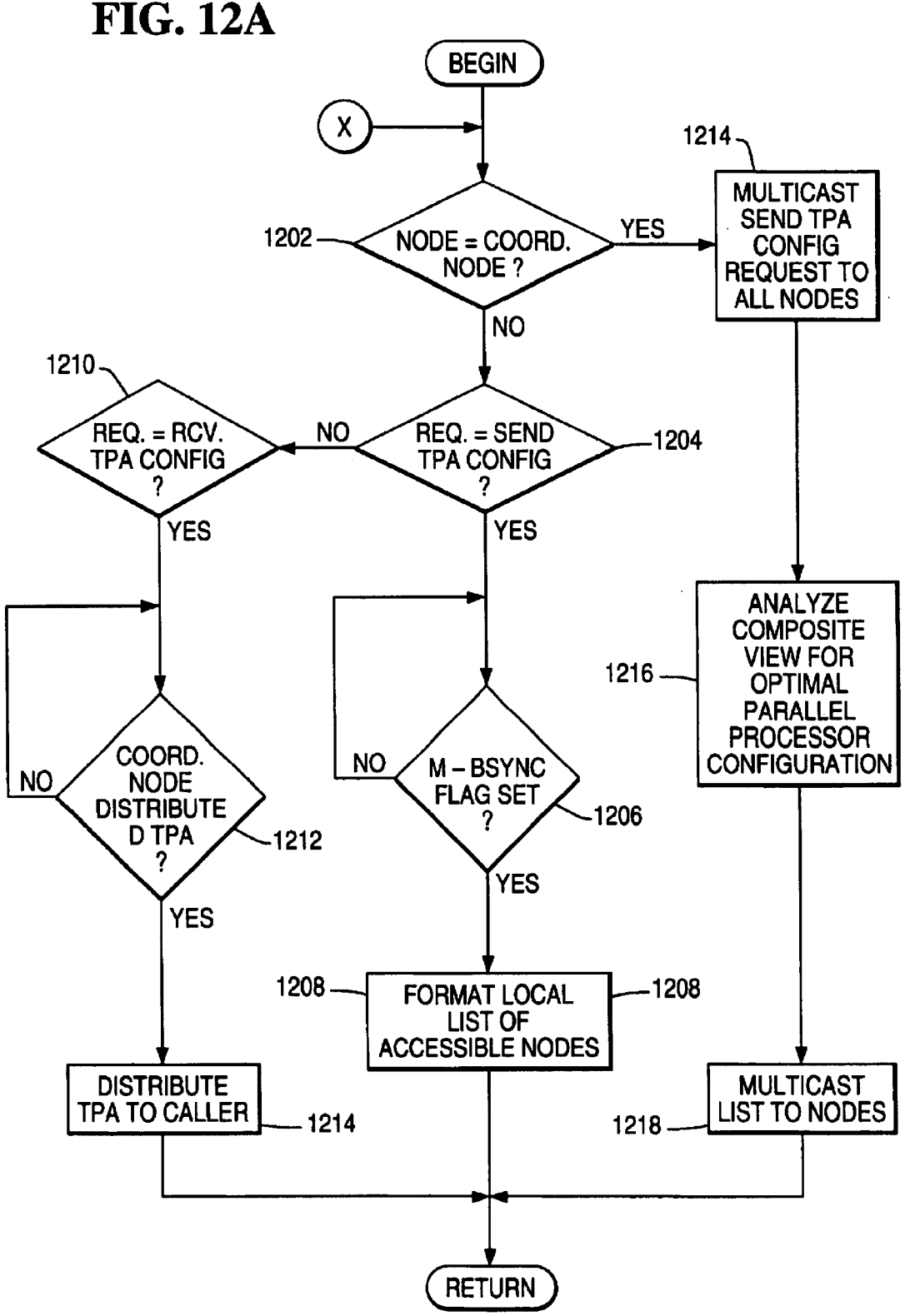
FIG. 12A is a flow chart illustrating the process steps performed by the nodes when the OSRequest method is called.

FIG. 12A is a flow chart illustrating the process steps performed by the nodes 106 when the OSRequest method is called. Block 1202 examines the m_nCoordinatorNodeID to determine if the node 106 is a coordinator node 108. If the node 106 is not the coordinator node 108 (and hence, a non-coordinator node) block 1204 determines the request type.

If the request type is SendTPAConfiguration, the local list of accessible nodes 106 is formatted for transmission to the coordinator node 108. This request is blocked until the node begins the SelectTPA service. This is accomplished by blocking until a flag (m_bSynchronizeFlag) is set (which occurs when the node begins the SelectTPA service). This is indicated by blocks 1206 and 1208.

If the node 106 is a non-coordinator node and the Request type is ReceiveTPAConfiguration, the TPAConfig object is examined to see if the coordinator has distributed the TPA list. This is determined by examining whether the coordinator node has advanced m_nState to the "configured" state. If the list has not arrived, the node 106 sleeps for a short duration before restarting this method. The node 106 returns the TPA information to the caller (via COR) when it arrives. These operations are illustrated in blocks 1202–1204 and 1210–1214.

If the node is the coordinator node 108, the coordinator node 108 multicasts a "send TPA configuration" request to all nodes 106, which instructs the nodes to return their local view of the system. This is illustrated in block 1214. After all of the non-coordinator nodes have returned their local view of the system, the coordinator node merges the information obtained from each node 106 to create a composite view of the system. If a particular node 106 does not respond to the request for local information within a maximum configuration time, the coordinator node 108 drops the node 106 from consideration to be a member of the configured parallel processing system. The coordinator node 108 then analyzes the composite view to determine an optimal parallel processor configuration, as shown in block 1216. A list comprising the nodes in the optimal parallel processing configuration is then generated. The foregoing steps are depicted by block 1218. The multicast circuit is then used with the Request field set to ReceiveTPAConfiguration in order to multicast the final TPA list to the nodes 106 that are members of the TPA list.

Figure 12B:
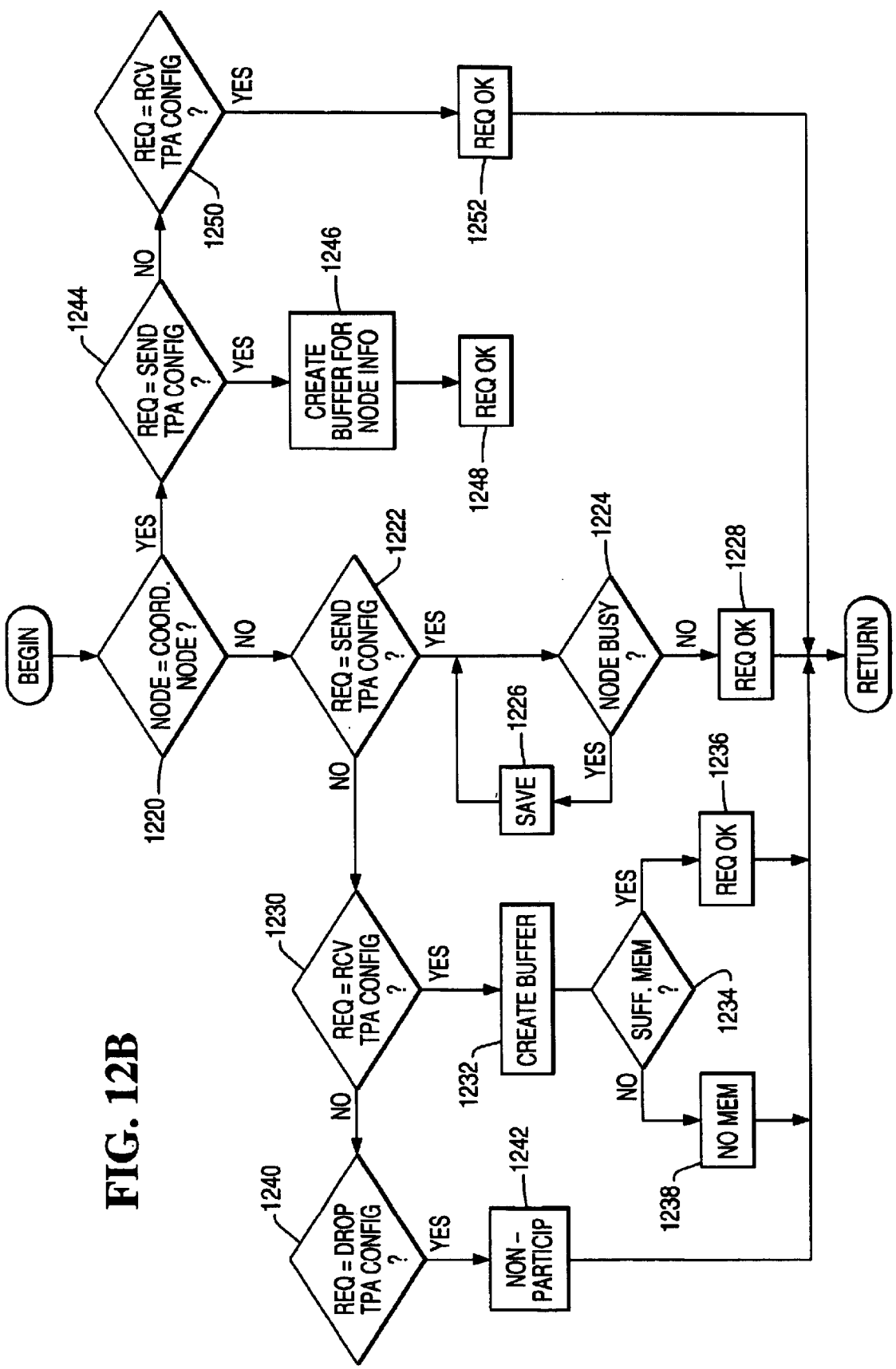
FIG. 12B is a flow chart illustrating the process steps performed by the nodes when the StartBynetRequest method is called.

FIG. 12B is a flow chart illustrating the processing steps performed by the nodes 106 when the StartBynetRequest method is invoked. Block 1220 checks to determine whether the node is a coordinator node 108.

If the node 106 is not a coordinator node, logic is transferred to block 1222, which determines whether the request is a SendTPAConfiguration request. If so, the node 106 is checked to determine if it is currently busy resetting itself, as depicted in block 1224. If the node is busy, the request is saved so it can be executed after the node 106 starts the service. The node 106 then responds with a RequestOK message, as shown in block 1228.

If the node 106 is not a coordinator node and the request is not a SendTPAConfiguration request, logic transfers to block 1230, where the request is checked to determine if it is a ReceiveTPAConfiguration request. If so, the node 106 receiving the request creates the necessary buffers to hold the final TPA list and replies with RequestOK. If memory cannot be allocated, the node 106 replies with a NoMemory message. These operations are illustrated in blocks 1232–1238.

If the node 106 is not a coordinator node and the Request type is DropTPAConfiguration, the receiving node 106 returns a message indicating the non-participant status of the node, as shown in blocks 1240 and 1242. However, the request to drop the node from the configured parallel processing system is handled by the CompleteBynetRequest method described below.

If block 1220 determines that the node is the coordinator node 108, logic is transferred to block 1244, which determines whether the Request type is SendTPAConfiguration.

If so, the receiving coordinator node 108 creates the necessary buffers to hold the node information and replies with a RequestOK message, as shown in blocks 1246 and 1248. The receiving coordinator node 108 replies with a NoMemory if memory cannot be allocated.

If block 1220 determines that the node is the coordinator node 108, and the Request type is ReceiveTPAConfiguration, the receiving coordinator node 108 replies with RequestOK message, as shown in blocks 1250 and 1252.

If the node 106 is a non-TPA node, the receiver returns a message indicating its non-participant status.

Figure 12C:
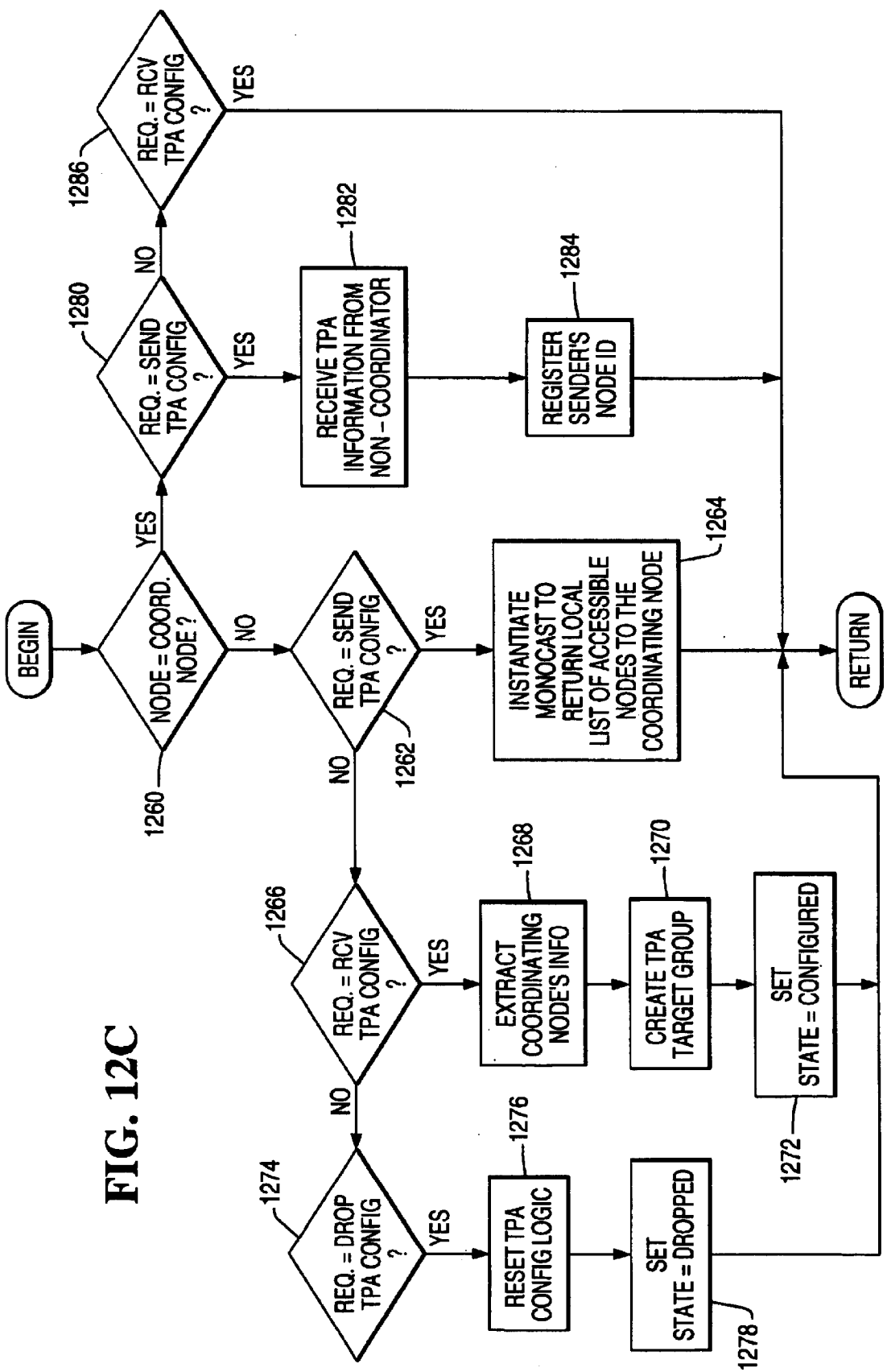
FIG. 12C is a flow chart illustrating the process steps performed by the nodes when the CompleteBynetRequest method is invoked.

FIG. 12C is a flow chart illustrating the process steps performed by the nodes 106 when the CompleteBynetRequest method is invoked. Block 1260 checks to determine whether the node 106 is the coordinating node 108. If it is not the coordinating node 108, and the Request type is SendTPAConfiguration, a monocast service is instantiated to return the local list of accessible nodes to the coordinator node 108. This is illustrated in blocks 1262 and 1264.

If the node 106 is a non-coordinator node and the Request type is ReceiveTPAConfiguration, the receiving node extracts the coordinating node's TPA information, creates a TPA target group, and advances the state to a "Configured" state. This causes the service blocked in the StartOSRequest (SOR) to eventually call the CompleteOSRequest (COR). The coordinator node 108 does not rely on this method to return TPA information to the calling routine. These steps are illustrated in blocks 1266–1272.

If the node 106 is a non-coordinator node and the Request type is ropTPAConfiguration, the node 106 resets the TPA configuration logic, and enters the "Dropped" state. This is illustrated in steps 1274–1278.

If the node 106 is the coordinator node 108 and the Request type is SendTPAConfiguration, the received TPA information from the non-coordinator node is merged with a composite of the information from the other similarly responding nodes, and the sending node's node ID is registered in a table. The table is used to detect when all nodes 106 have responded. This process is illustrated in blocks 1280–1284.

If the node 106 is the coordinator node 108 and the Request type is ReceiveTPAConfiguration, the node 106 does nothing.

Figure 12D:
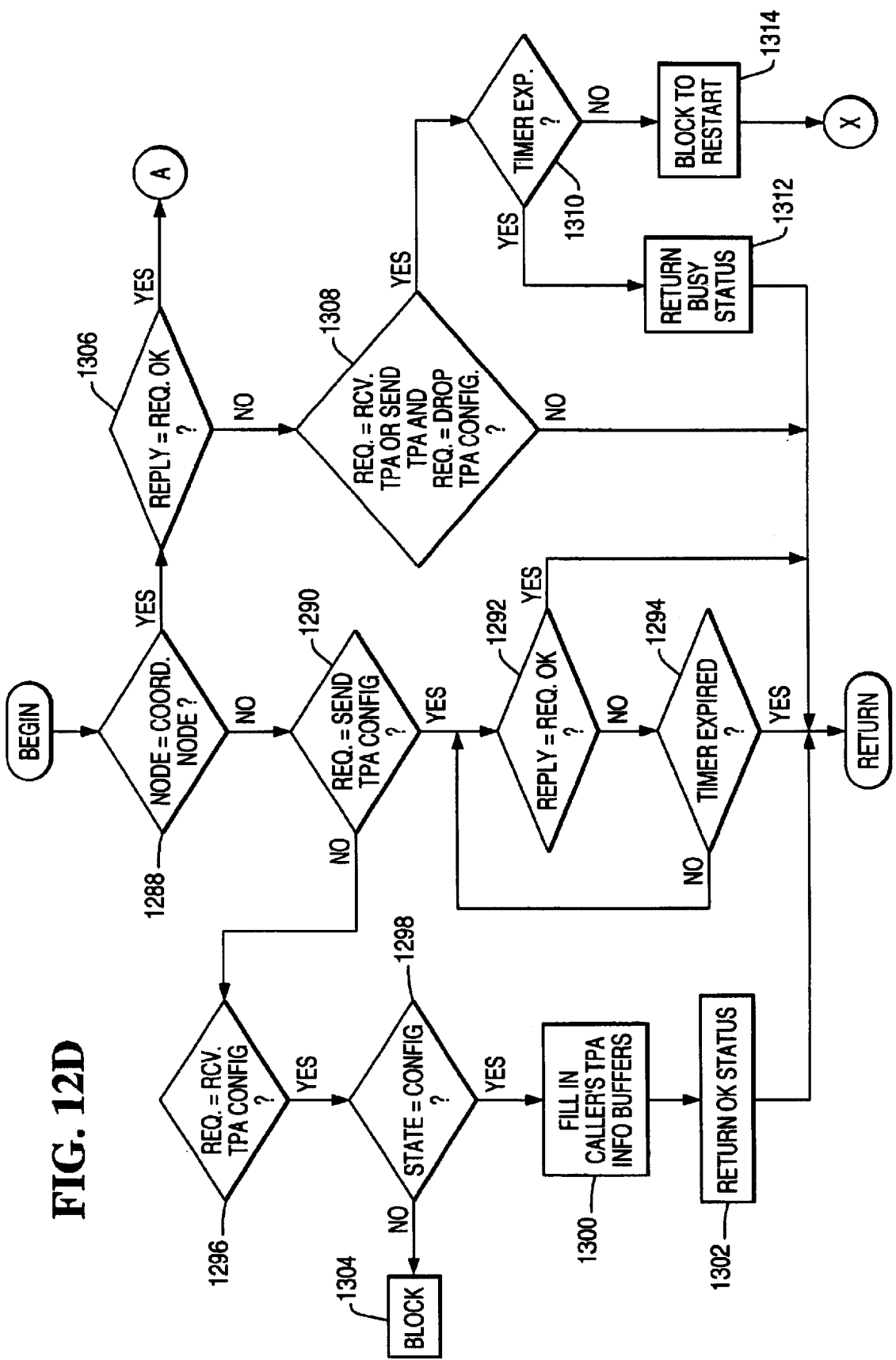
FIGS. 12D and 12E are flow charts illustrating the process steps performed by the nodes when the CompleteOSRequest method is called.
Figure 12E:
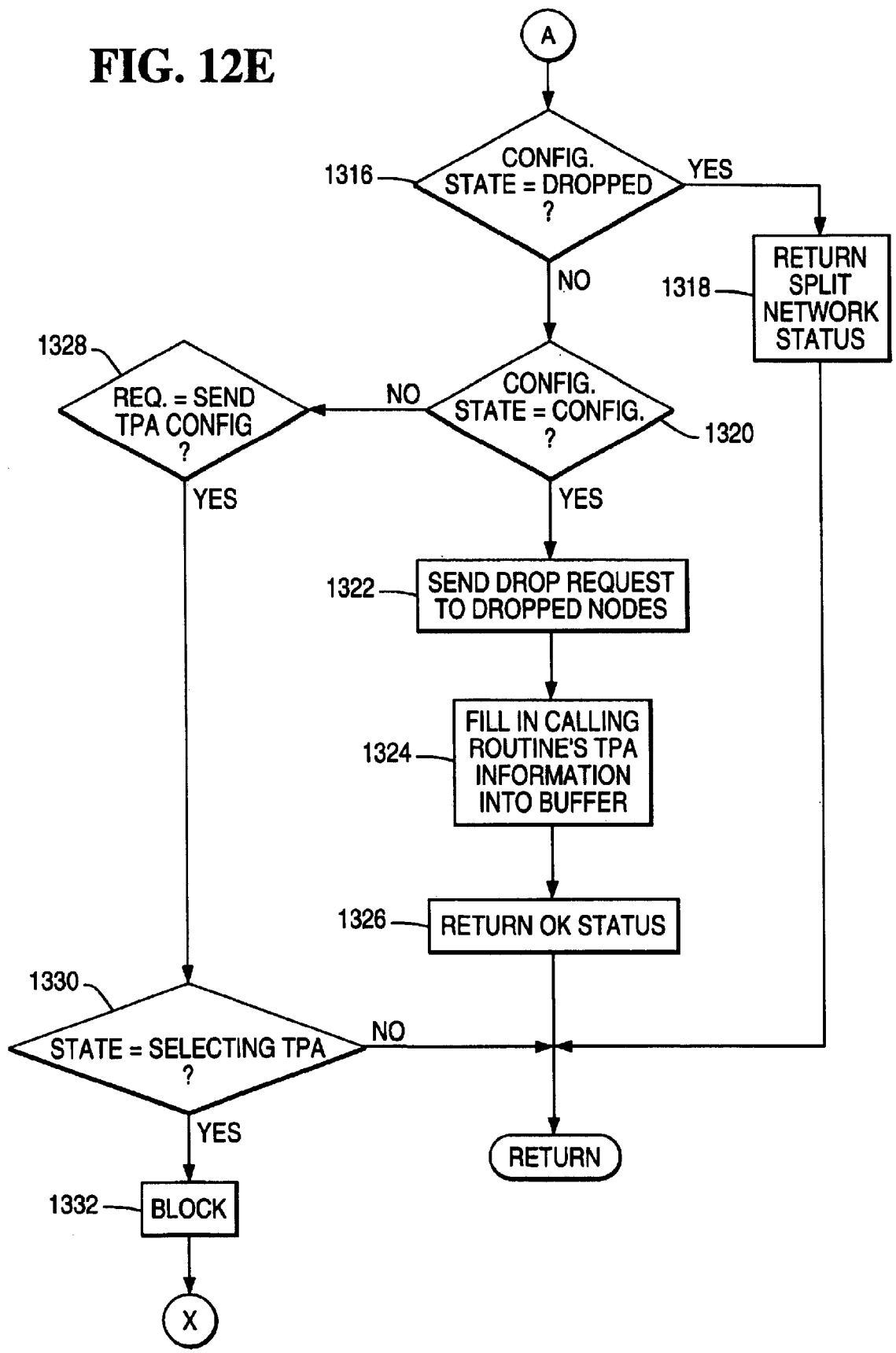

FIGS. 12D and 12E are flow charts illustrating the process steps performed by the nodes 106 when the CompleteOSRequest method is called. Block 1288 checks to determine if the node 106 is a coordinator node 108.

If the node 106 is a non-coordinator node and the Request type is SendTPAConfiguration, the service is blocked if the reply is not RequestOK and the timer has not expired. This is illustrated in blocks 1290–1294. Further, if the node is a non-coordinator node and the configuration state is "Dropped," the node returns a "NodeDown" status to the caller.

If the node 106 is a non-coordinator node and the Request type is ReceiveTPAConfiguration, the service is blocked if the state is not "Configured." If the receiving node's configuration state is "Configured," the node 106 fills in the calling routine's TPA information buffers, initializes the static objects'owner field (for Chn, Grp, and Sem) to the coordinator's node ID, advances the RxResetState to RxAccept, and returns OK status to the calling node. This is illustrated in blocks 1296 to 1302.

If the node 106 is the coordinator node 108 and the reply is RequestOK, processing proceeds to block 1316. If the node 106 is the coordinator node 108 and the reply is not RequestOK, logic is passed to block 1310 if the Request type is DropTPAConfiguration or ReceiveTPAConfiguration. Block 1310 checks to determine if the timer has expired. If so, a busy status is returned 1312. If not, processing returns to block 1202 after the service blocks to restart.

If the node 106 is the coordinator node 108 and the configuration state is "Dropped," the node 106 returns a "SplitNet" status to the calling node. This is depicted in blocks 1306, 1316, and 1318.

If the node 106 is the coordinator node 108 and the configuration state is "Configured," the configuration node 108 sends a drop request to each dropped node. The configuration node 108 also fills in the calling routine's TPA info buffers, initializes the static objects'owner field (for Chn, Grp, and Sem) to this node ID, advances the RxResetState to RxAccept, and returns OK status to the caller. This is depicted in blocks 1320–1326.

If the node 106 is the coordinator node 108, the Request type is SendTPAConfiguration, and the state is SelectingTPA, the coordinator node 108 performs a block 1304 in order to broadcast the final TPA information. The request is changed to ReceiveTPAConfiguration before blocking. This is illustrated in blocks 1328–1334.

Figure 13:
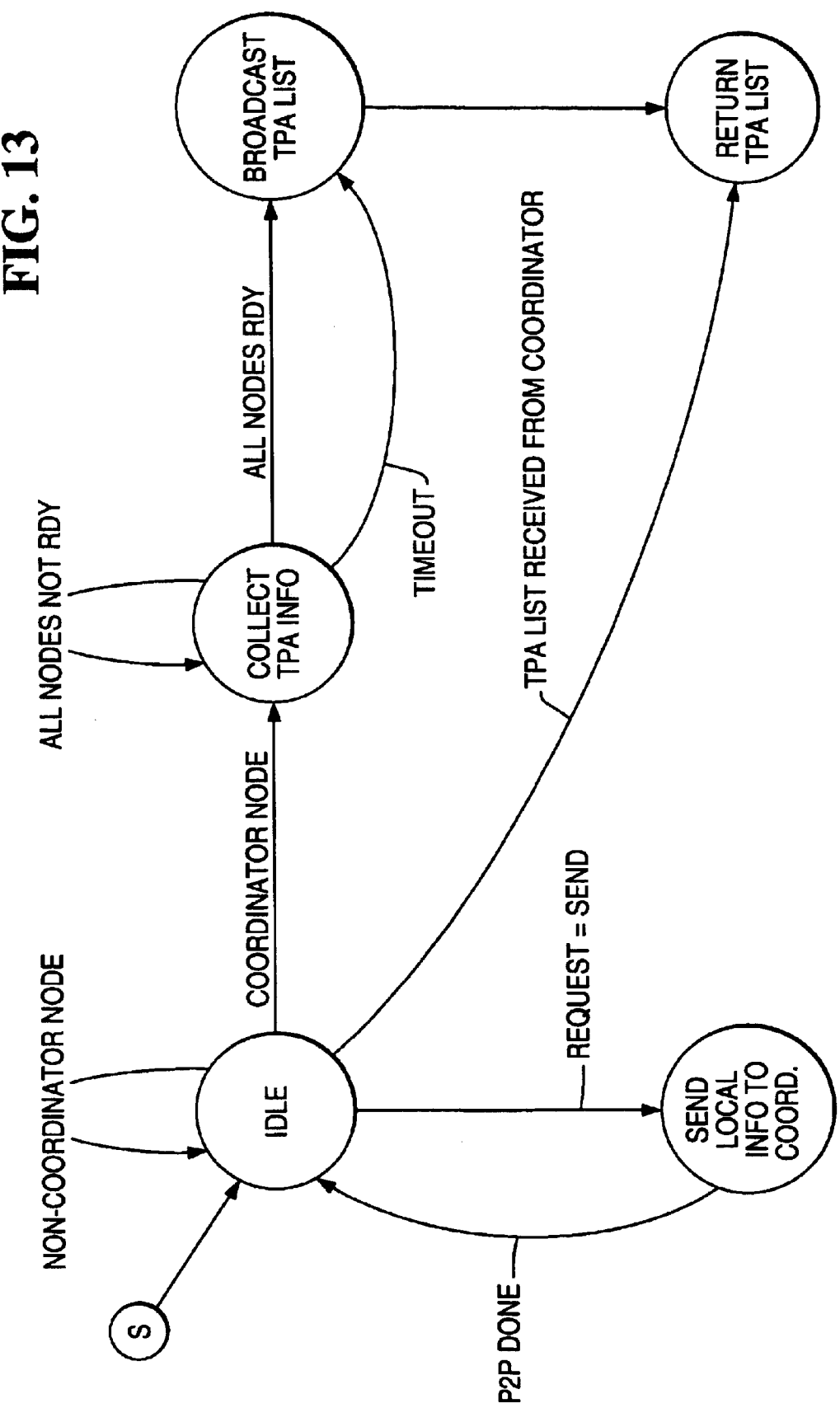
FIG. 13 is a state transition diagram illustrating the operations performed in electing the parallel processing configuration.

FIG. 13 is a state-transition diagram illustrating the foregoing logical operations.

Figure 14A:
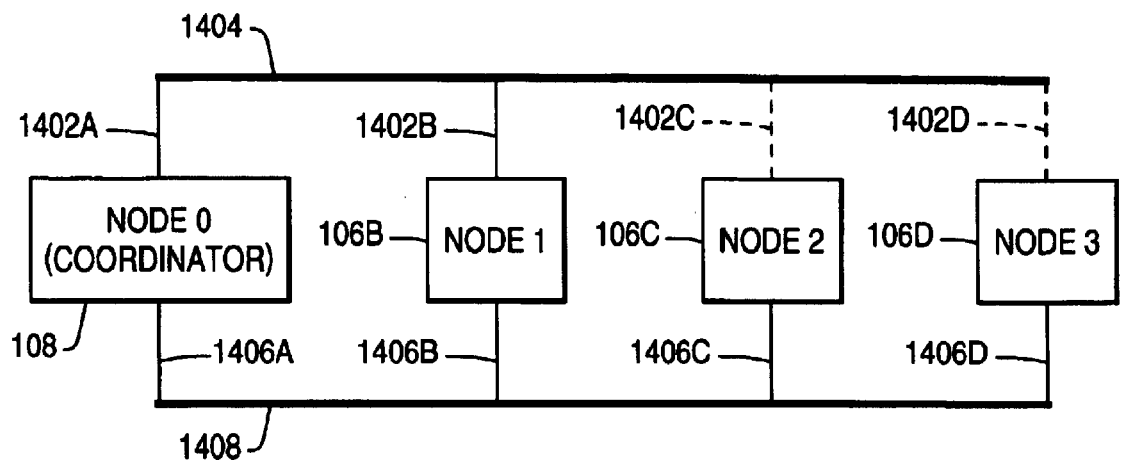
FIGS. 14A–14C are diagrams illustrating selected conditions that can occur during TPA initialization.
Figure 14B:
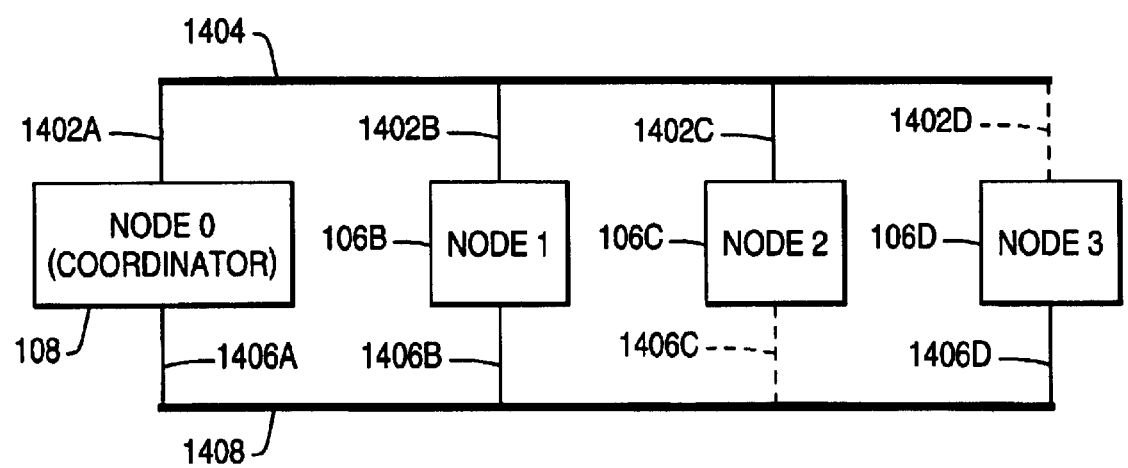
Figure 14C:
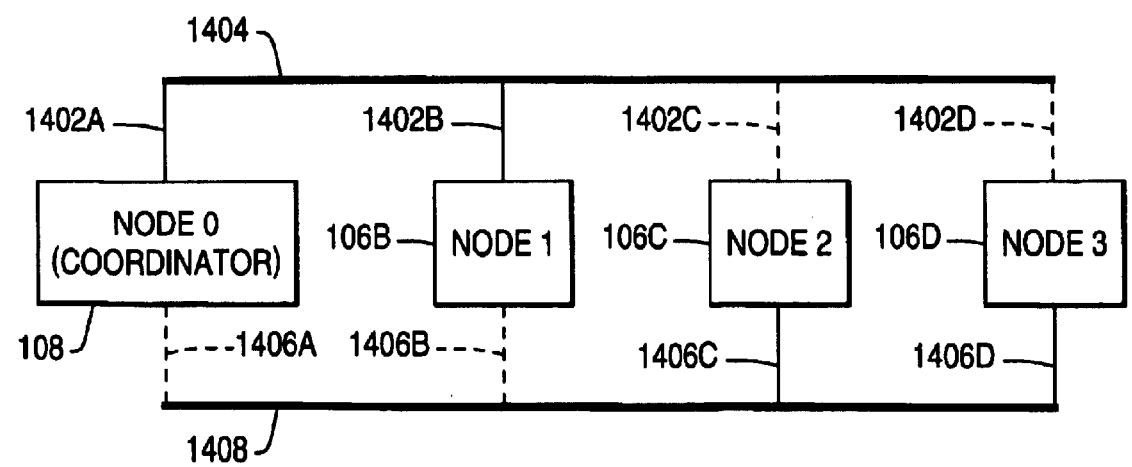

FIGS. 14A–14C are diagrams illustrating selected conditions that can occur during TPA initialization. For exemplary purposes, the processing system illustrated in FIGS. 14A–14C include only two networks (first network 1404 and second network 1408), and four nodes, which include node 0, which has been chosen to be the coordinator node 108, and non-coordinator nodes 1–3 (106–106D, respectively). Connectivity between nodes 106 and networks 1404 and 1408 is shown by a solid line, and non-connectivity is indicated by a dashed line.

FIG. 14A illustrates a system wherein only two of the nodes (node 0 108 and node 1 106B) have access to both the first network 1404 and the second network 1408. In this scenario, one of the nodes on both nets are selected as the coordinator node 108. The system operates normally and the BLLI driver 206 routes messages to the appropriate network.

FIG. 14B illustrates a system wherein the two single-net nodes (node 2 106C and node 3 106D) are on different networks. This condition is called a disjoint network since the two single-net nodes (node 2 106C and node 3 106D) cannot communicate directly with each other. As described above, the coordinator node 108 chooses the network 1404, 1408 with the most number of nodes 106. In the exemplary system depicted in FIG. 14B, either network can be chosen since both have three nodes. In this case, one of the single-net nodes is excluded from the TPA when the configuration is complete.

In FIG. 14C, each net has only two nodes connected. In this scenario, a TPA is not possible because neither the first network 1404 nor the second network 1408 has a majority of nodes 106 connected. If the nodes 106 were permitted to establish a TPA, the database would become corrupted because each pair of nodes would look like a TPA. For this reason a TPA can only be established if a majority of nodes 106 is seen on a network.

Synchronizing TPA Nodes

The Synchronize_tpa service is used during TPA initialization to synchronize all nodes participating in the TPA.

When a node reaches a synchronization point, the node 106 calls synchronize_tpa( ) to issue a RegisterNode request to the coordinator node 108. The node 106 then sleeps until the coordinator node 108 instructs it to wake up, or until a timer expires. The coordinator node issues the WakeupUser request to all TPA nodes 106 when the last node registers. The sleeping services may also wake up if they do not receive the WakeupUser request within the specified time limit provided by the user.

The Synchronize_tpa service is also used to force the coordinator node to reset its SelectTPA timer. This service is used whenever a node 106 is known to be down, and the operator does not want to wait for the timer to expire before proceeding with TPA selection. The operator can run the tpasetcfg utility on any node to issue this request.

Figure 15A:
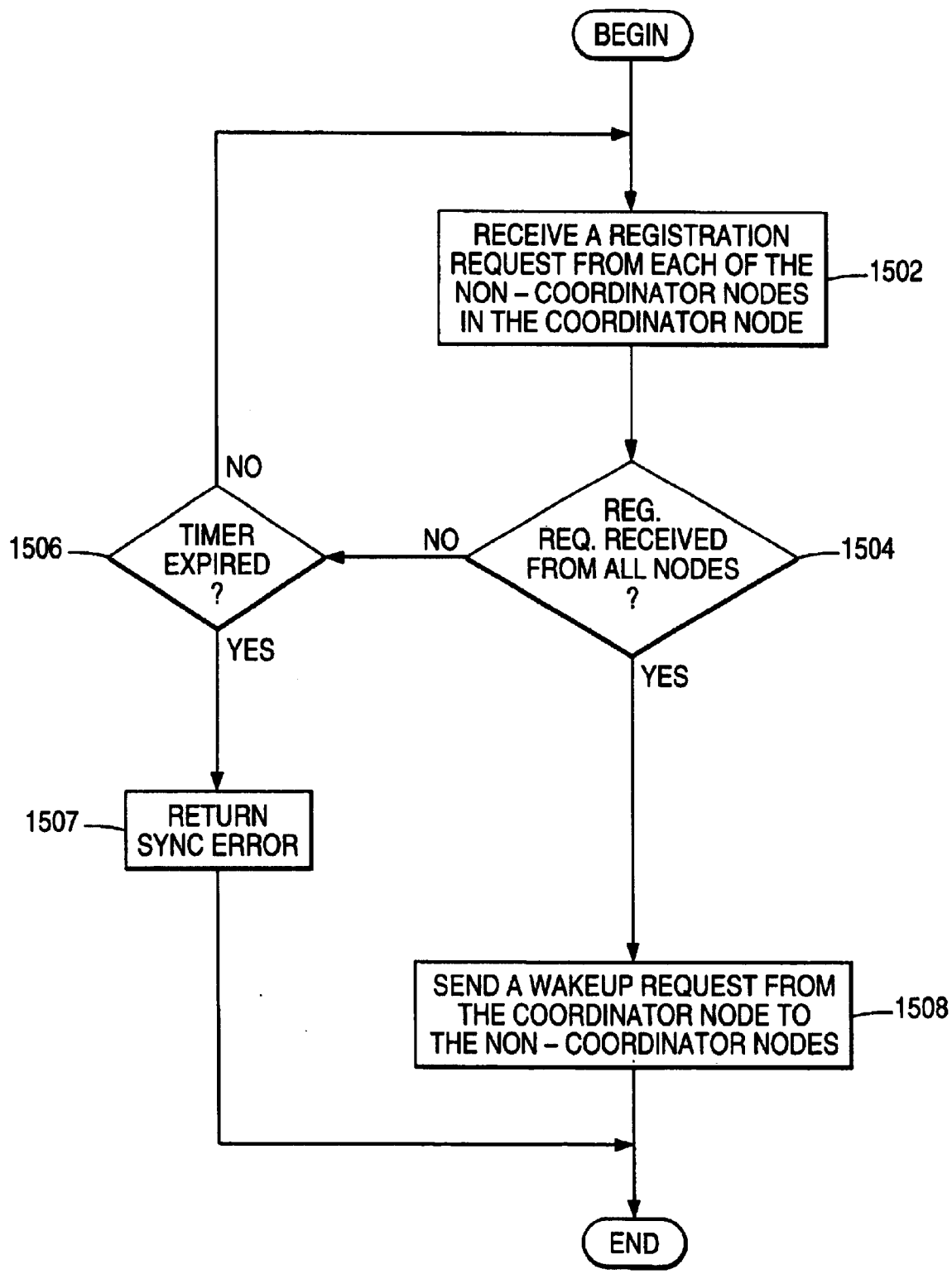
FIGS. 15A and 15B are flow charts illustrating process steps used to synchronize the TPA nodes.
Figure 15B:
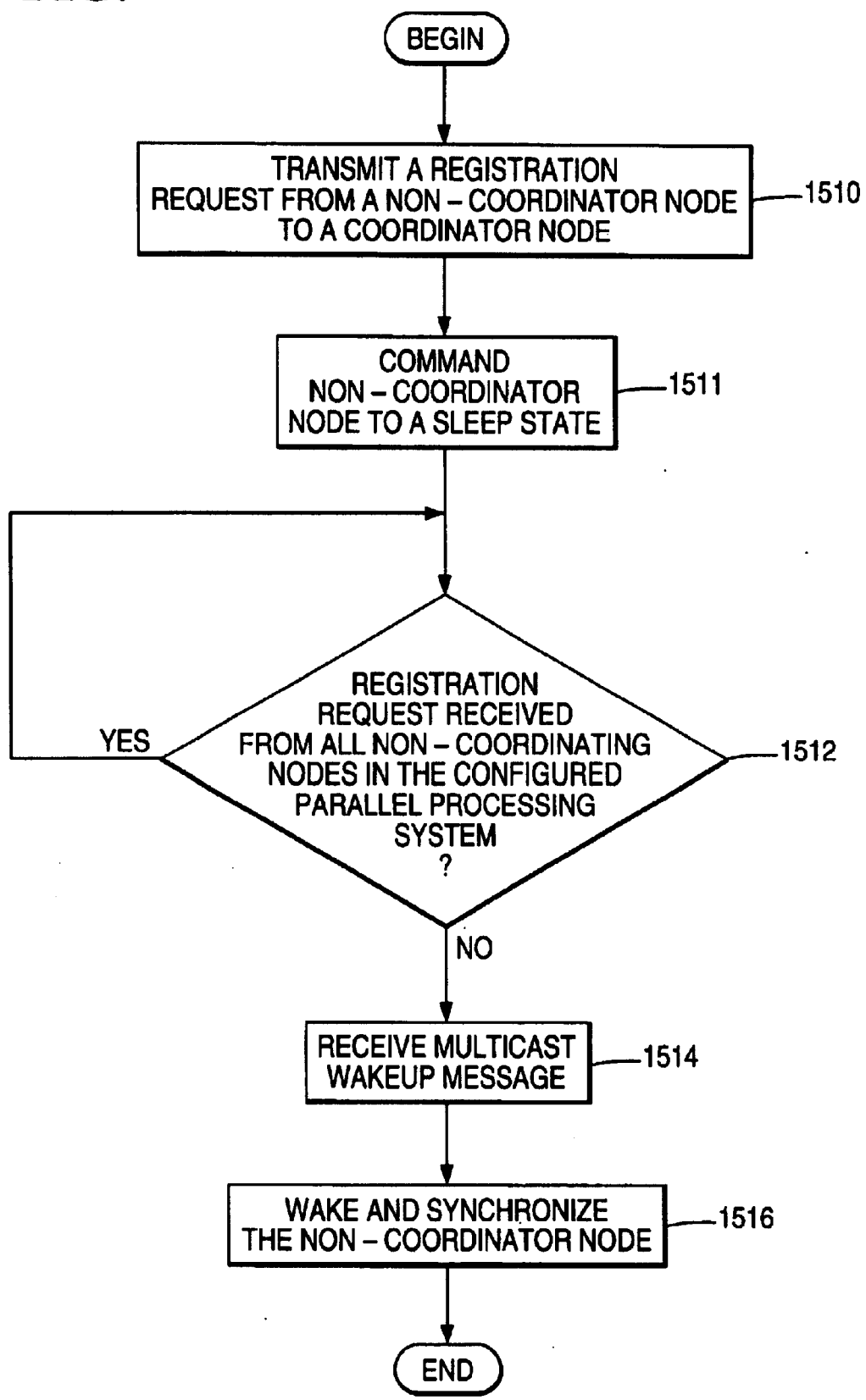

FIGS. 15A and 15B are flow charts illustrating process steps used to synchronize the TPA nodes.

FIG. 15A shows the process steps from the perspective of the coordinating node 108. First, a registration request is received from a non-coordinator node in the coordinator node, as shown in block 1502. Then, after a registration request has been received from all nodes in the TPA, a wakeup request is sent from the coordinator node to the non-coordinator nodes. This is illustrated in blocks 1504–1508. In one embodiment of the present invention, the operations depicted in block 1502 include the steps of adding the node ID from each non-coordinator node to a node synchronization list and incrementing a node synchronization count. In this embodiment, the operations described in block 1508 also include the steps of multicasting a wakeup message from the coordinator node to each of the non-coordinator nodes from which a registration request was received.

FIG. 15B shows the process steps from the perspective of the non-coordinating nodes that are members of the TPA. First, a registration request is transmitted from the non-coordinator node to the coordinator node 108, as shown in block 1510. Then, the non-coordinator node that transmitted the registration request enters a sleep mode, as illustrated in block 1511. When a registration request has been received for all non-coordinating nodes in the configured parallel processing system, the non-coordinating nodes receive a multicast wakeup message from the coordinating node 108. This is illustrated in blocks 1512 and 1514. Each of the non-coordinating nodes then wakes up and synchronizes themselves, as shown in block 1516.

Figure 16A:
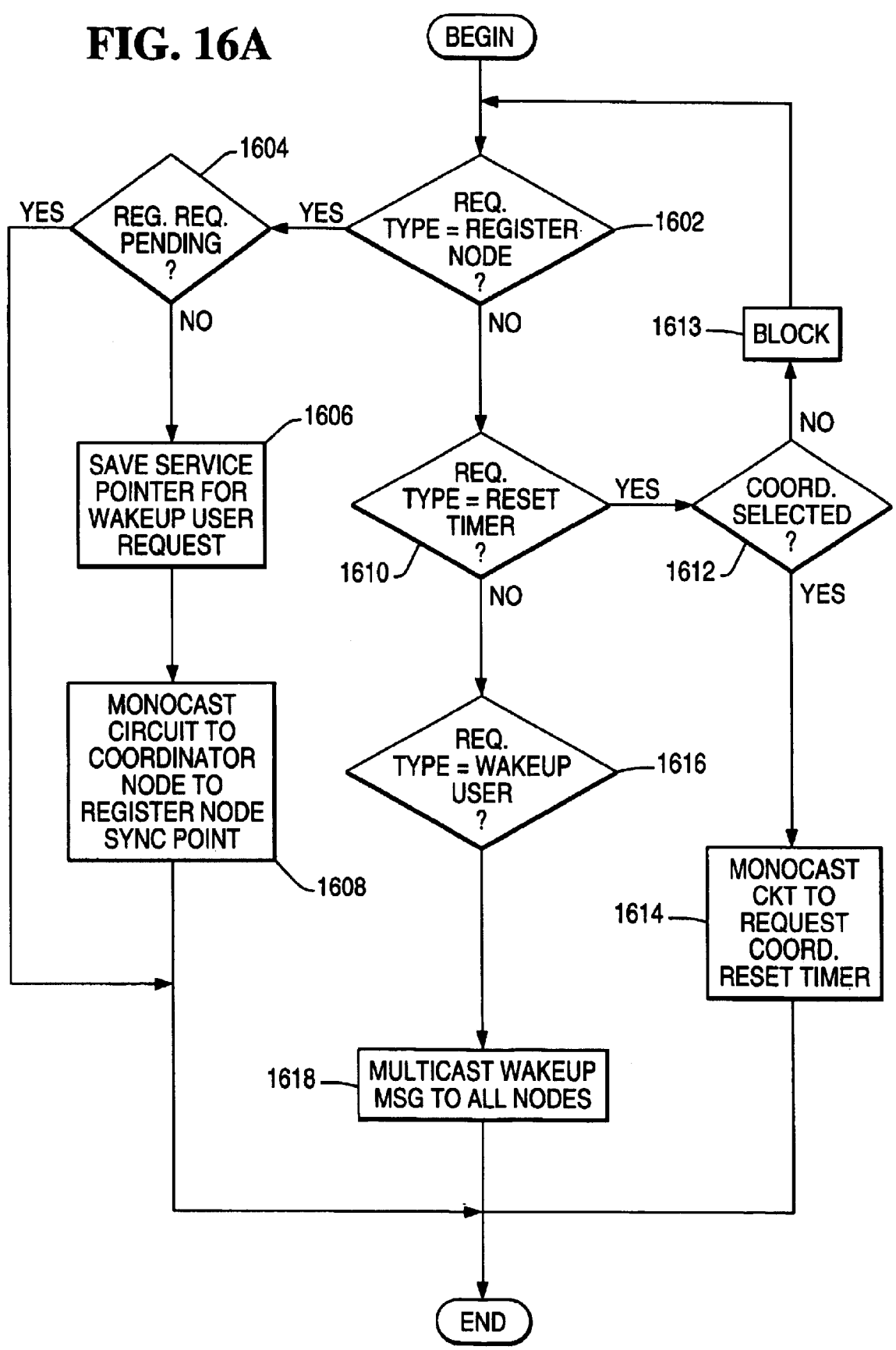
FIGS. 16A–16C are flow charts illustrating additional detail of the process steps used to synchronize the TPA nodes.
Figure 16B:
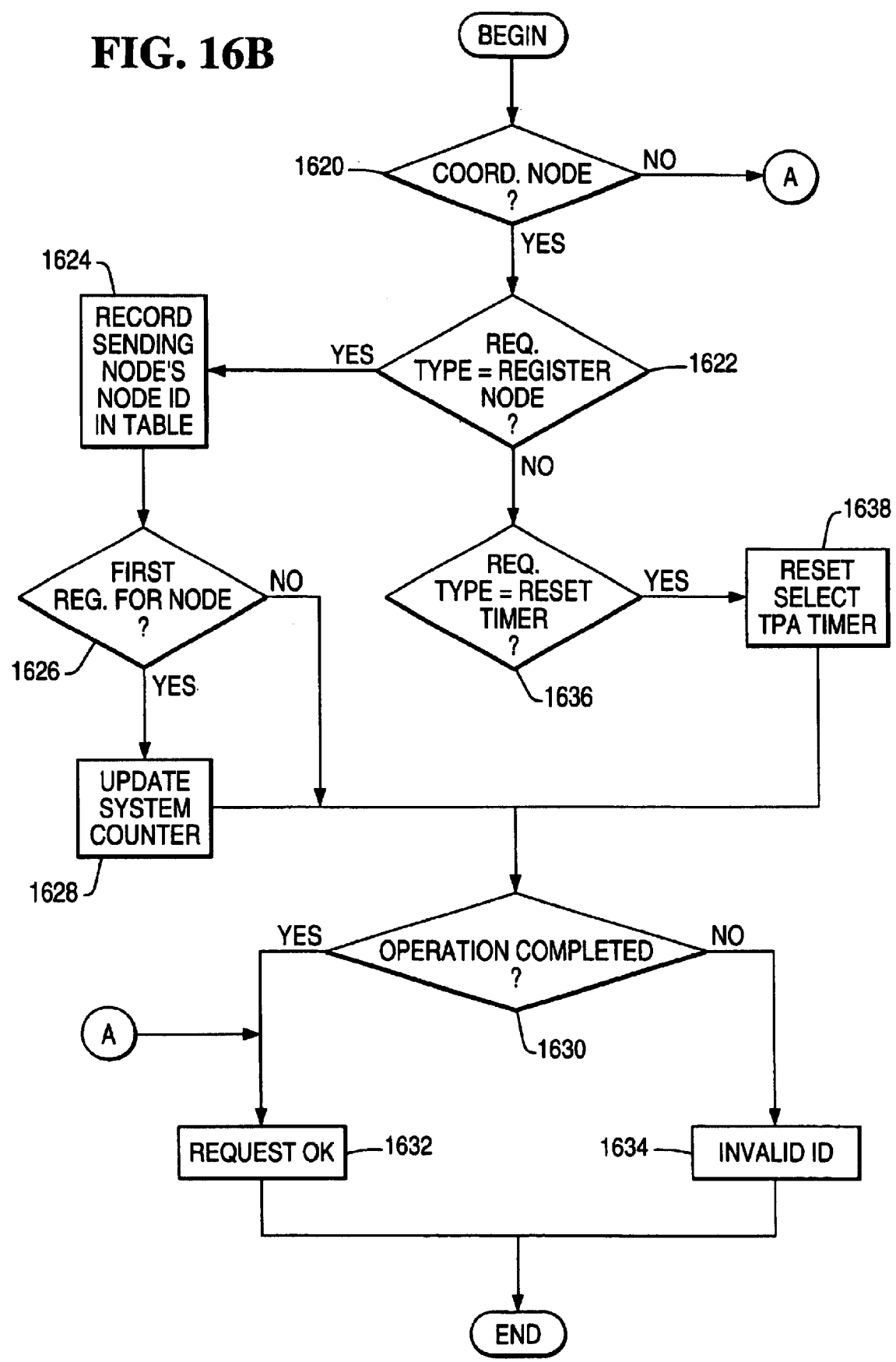
Figure 16C:
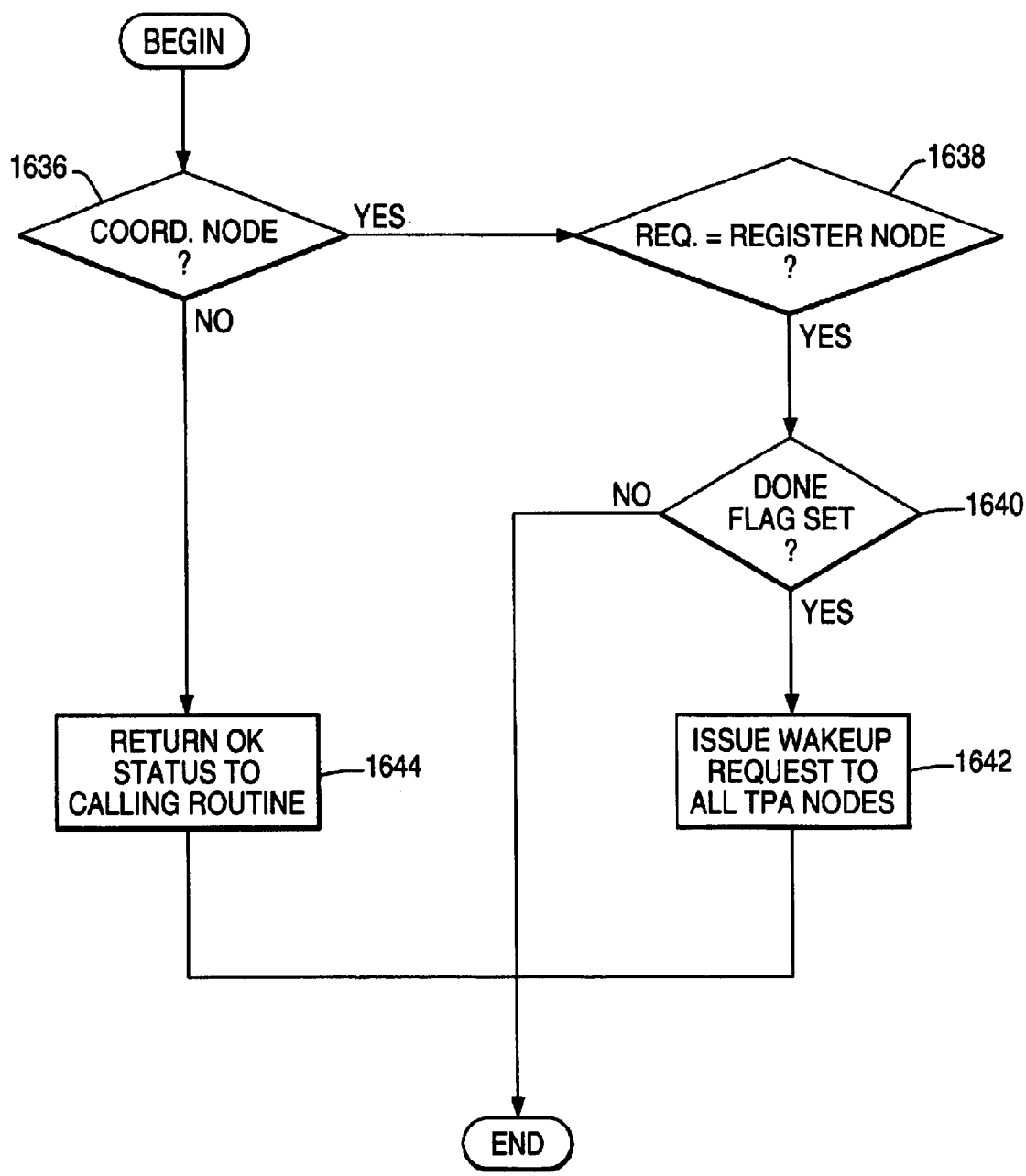

FIGS. 16A–16C show the foregoing operations in additional detail. FIG. 16A show the operations that are performed as a part of the methods illustrated in FIG. 11.

FIG. 16A shows the steps performed in connection with the StartOSRequest method. If the Request type is RegisterNode, the service pointer is saved for the WakeupUser request and a monocast circuit is made to the coordinator to register this node's synchronization point if a register request is not already pending. This is illustrated in blocks 1602–1608.

If the Request type is ResetTimer, the service blocks for a short period if the coordinator node 108 has not been selected. A monocast circuit is made to the coordinator node 108 to request it to reset its timer. This is illustrated in blocks 1610–1614.

If the Request type is WakeupUser, a multicast circuit is made to all TPA nodes, instructing them to wake up their sync service. This is illustrated in blocks 1616–1618.

FIG. 16B is a flow chart illustrating the steps performed in connection with the StartBynetRequest method.

If the node is the coordinator node 108 and the Request type is RegisterNode, the coordinator node records the sender's node ID in a table, then updates the synchronization count if this is the first time the sender has registered. A done flag is set if all TPA nodes have registered. The node replies with RequestOK if it performed the function, or InvalidID (i.e. not ready) if it did not perform the function. The foregoing steps are illustrated in blocks 1620–1634.

If the Request type is ResetTimer, the coordinator node 108 resets the SelectTPA timer, as shown in block 1638. The node 106 replies with RequestOK if it reset the timer, or InvalidID (i.e. not ready) if it did not reset the timer.

FIG. 16C is a flow chart showing the steps performed in connection with the CompleteBynetRequest method. If the node is the coordinator node 108 and the Request type is RegisterNode, the coordinator node issues a WakeupUser request to all TPA nodes if the done flag was set in the SBR. This is illustrated in blocks 1636–1642. If the node is a non-coordinating node and the Request type is WakeupUser, the saved service pointer is used to return OK status to the caller, as shown in blocks 1636 and 1644. Finally, when a node 106 receives the reply, it invokes the CompleteOSRequest method. According to this method, the service blocks if the reply is not RequestOK.

Figure 17:
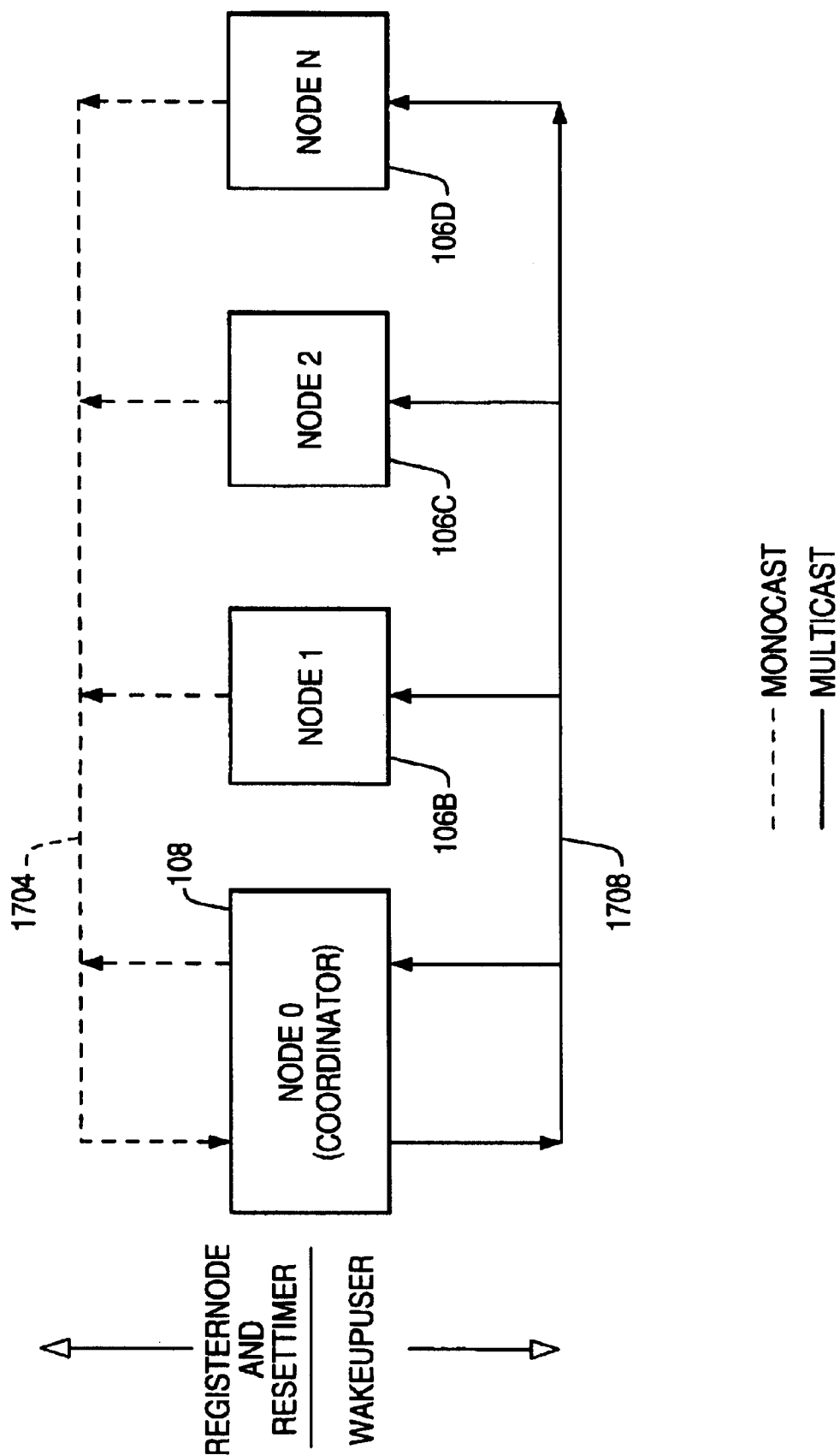
FIG. 17 is a diagram showing the monocast and multicast communication circuits used in synchronizing the TPA nodes.

FIG. 17 is a diagram showing the monocast and multicast communication circuits used in synchronizing the TPA nodes. As shown in FIG. 17, a monocast communication circuit 1704 is used for RegisterNode and ResetTimer requests, while a multicast communication circuit 1708 is used for WakeupUser requests.

Figure 18:
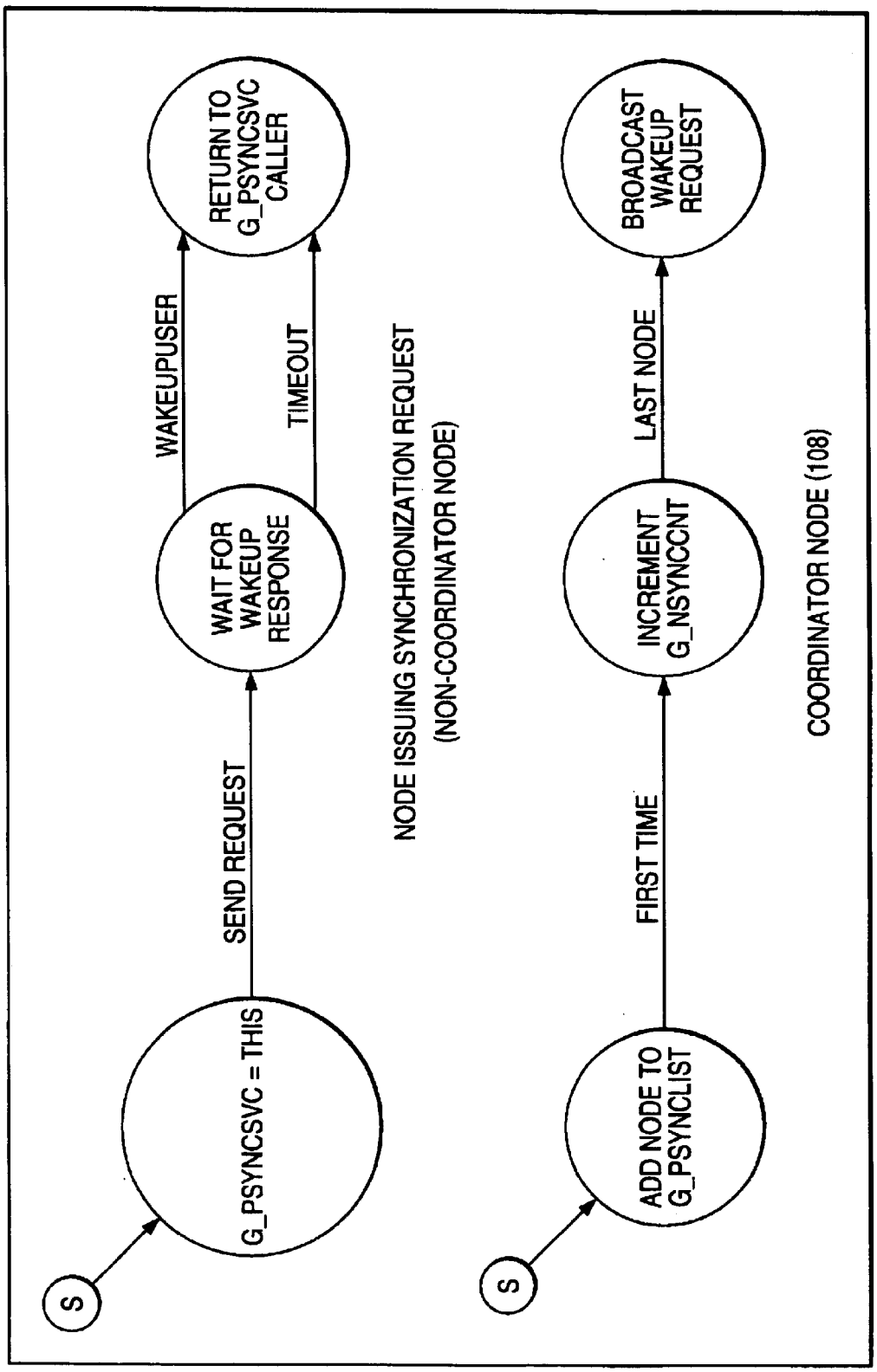
FIG. 18 is a state transition diagram showing the TPA node synchronization operations for the coordinator node and the non-coordinator nodes.

FIG. 18 is a state transition diagram showing the TPA node synchronization operations for the coordinator node 108 and non-coordinator nodes.

Figure 19:
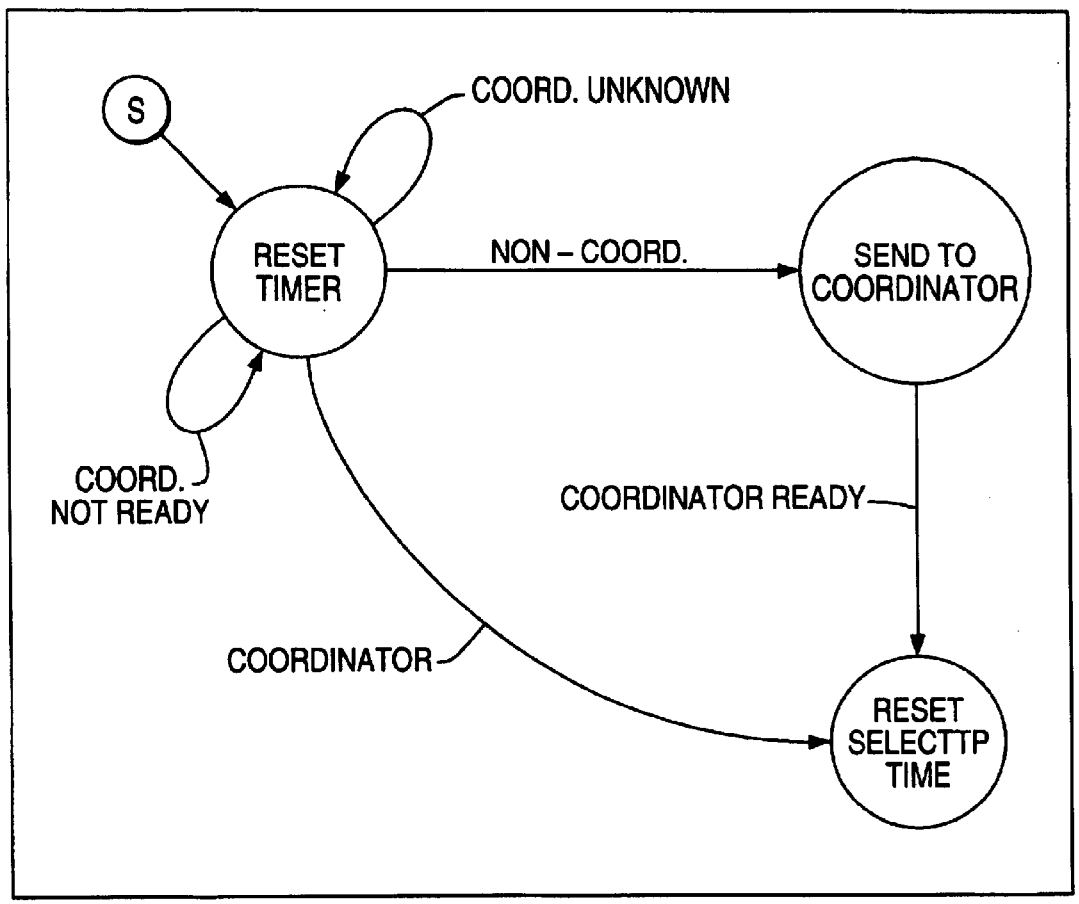
FIG. 19 is a state transition diagram showing reset timer operations.

FIG. 19 is a state transition diagram showing the Reset timer operations.

Late Joiner Node Handling

A late-joiner node is a node that attempts to become part of the TPA configuration after the TPA has been configured. A late-joiner node is notified of this condition during the SelectCoordinator service. During the SelectCoordinator service, the StartOSRequest method 1102 returns LateJoiner status to the select_coordinator routine if the state is "Dropped." Further, the CompleteOSRequest method 1108 returns LateJoiner status to the select_coordinator routine if the merged reply is LateNode.

The SelectTPA service does not return LateJoiner status. Any node 106 that reaches this service is permitted to join the TPA if the coordinator node 108 includes it.

Dropped Node Handling

There are times when a node 106 must be dropped from the TPA configuration because it is not accessible from all nodes 106 in the m_pTPANodeList. A node 106 is dropped from the configured parallel processing system during the SelectTPA service.

If a node 106 detects that it was dropped from the TPA and the SelectCoordinator service runs, the SelectCoordinator service returns LateJoiner status to the calling routine.

The coordinator node 108 is responsible for informing non-coordinator nodes 106 when the node is being dropped during the SelectTPA service. The coordinator node 108 establishes a monocast circuit to the dropped node 106 with the Request field set to DropTPAConfiguration. The dropped node 106 aborts any further participation in the TPA selection and return NodeDown status to the user.

APPENDIX A

SelectCoordinator Service

Table VI is a list of the data members that are part of the SelectCoordinator service. These data members are sent across the network.

TABLE VI

| | |
|---|---|
| m_bAbort | This member is a boolean flag that causes the coordinator node to abort its SelectTPA timer and continue TPA selection. |
| m_nNetGroup | This member is the current target group id used for broadcasts. |
| m_nFirstGroup | This member is the first target group id used for broadcasts. This may be different from m_nNetGroup if multiple nets are needed to reach all nodes. |
| m_nBestID | This member is the node id associated with the current best node list |

SelectTPA Service

The data members described in Table VII below are part of the SelectTPA service. These data members are sent across the network.

TABLE VII

| | |
|---|---|
| m_nRequest | This member contains an identifier specifying the function to perform in this service. The valid identifiers are:<br>- SendTPAConfiguration: Instructs the receiving node to transmit its TPA configuration information.<br>- ReceiveTPAConfiguration: Instructs the receiving node to accept the TPA configuration information.<br>- DropTPAConfiguration: Instructs the receiving node to drop the TPA configuration information and to report back to the caller it has been excluded from the TPA. |
| m_nDestID | This member is the destination node id used for point-to-point circuits. |
| m_nTPAGroup | This member is the target group id used for broadcasts. |

TpaSynchronize Service

Table VIII presents the data members which are part of the TpaSynchronize service and are sent across the network.

TABLE VIII

| | |
|---|---|
| m_nRequest | This member contains an identifier specifying the function to perform in this service. Valid identifiers include:<br>- RegisterNode: Informs the coordinator that this node has reached its sync point.<br>- WakeupUser: Instructs a sleeping sync service to wakeup and return to the user; all nodes have reached the sync point.<br>- ResetTimer: Instructs the coordinator to reset its SelectTPA timer. |

BNS Services Data Members

The data members of the objects and other related data structures that are used by the BNS configuration services 304 are discussed below.

One of the objects used in the BNS configuration services is the NodeConfig object, which contains all information regarding the local node. The object includes the data members shown below in Table IX.

TABLE IX

| Data Member | Description |
|---|---|
| m_NodeID | This member is the local node's ID. |
| m_DesiredNodeList | This member is a pointer to the desired node list generated by the TPA Initialization layer. The list consists of n node-ids sorted numerically during construction of this object. |
| m_ActiveNodeList | This member is a pointer to a list of nodes on each net that can been seen from the local node. The list of nodes is organized by node-id as shown in Table X below. Each node entry contains a set of boolean flags showing which nets the node was detected on. The list of nodes is in numerical order and should match the m_DesiredNodeList array. |
| m_nDesiredNodeCount | This member is the number of nodes in m_DesiredNodeList. |
| m_nActiveNodeCount | This member is the number of nodes in m_ActiveNodeList. |
| m_TimeLimit | This member is the maximum time in seconds the caller can wait for an offline node to become active. |
| m_Lock | This member is used to lock the structure during updates and decision points. |

Table X below illustrates one embodiment of the format of the NodeList table.

TABLE X

| | Net 0 | Net 1 | Net 1 | Net 3 | ...Net n |
|---|---|---|---|---|---|
| node-id 0 | 0/1 | 0/1 | 0/1 | 0/1 | 0/1 |
| node-id 1 | 0/1 | 0/1 | 0/1 | 0/1 | 0/1 |
| node-id 2 | 0/1 | 0/1 | 0/1 | 0/1 | 0/1 |
| ... | | | | | |
| node-id n | 0/1 | 0/1 | 0/1 | 0/1 | 0/1 |

Another object used in the BNS configuration services is the TPAConfiguration object, which contains all information pertaining to selecting the TPA. The object includes the data members shown below in Table XI below.

TABLE XI

| Member | Description |
|---|---|
| m_nState | This member identifies the current state of the TPA configuration process. The valid states are:<br>- Idle: The initial state of the configuration process. This state is entered during a reset or when a node is dropped, and is active until the SelectingCoord state.<br>- SelectingCoord: The node has started the SelectCoordinator service. This state is active until the SelectingTPA state.<br>- SelectingTPA: The node has started the SelectTPA service. This state is active until the coordinator has distributed the TPA configuration to all nodes.<br>- Configuring: The coodinator node is waiting for non-coordinator nodes to send their local info.<br>- Configured: The node has received the TPA configuration from the coordinator and it is part of the TPA. This state is active until the next reset service. Non-TPA nodes return to the |

TABLE XI-continued

| Member | Description |
| --- | --- |
| | Idle state.<br>- Dropped: The node has been dropped from the TPA. This state is active until the configuration has been reset and the Idle state entered. |
| m_pStatistics | This member is a pointer to a statistics object. The statistics are retained across restarts. |
| m_nCoordinatorNodeID | This member contains the ID of the coordinator node when one is selected. Otherwise, it contains an invalid ID. |
| m_nTPANodeCount | This member contains the number of node IDs in m_pTPANodeList. |
| m_pTPANodeList | This member is a pointer to a list of nodes in the TPA. It has the same format as the m_pDesiredNodeList contained in the NodeConfig object. |
| m_nBestNodeID | This is the node ID for the node that currently has the best opportunity of being the TPA coordinator. It is the node id associated with m_pBestNodeList. |
| m_BestNodeList | This member is a pointer to a list of nodes for each net that the m_nBestNodeID node can see. It is used during the voting process to select a coordinator node. The format of this list is identical to the m_pActiveNodeList contained in the NodeConfig object. The node IDs in this list are a subset of the m_pBestDesiredNodeList array. |
| m_nBestDesiredNodeCount | This member contains the number of node IDs in m_pBestDesiredNodeList. |
| m_BestDesiredNodeList | This member is a pointer to the best list of desired TPA nodes received during the voting process. It is used in conjunction with the m_pBestNodeList table to select a coordinator node and the final TPA configuration. The format of this list is identical to the m_pDesiredNodeList contained in the NodeConfig object. |
| m_ExpectNonCoordCount | This member contains the number of expected non-coordinator nodes. |
| m_nNonCoordinatorCount | This member contains the number of non-coordinator nodes seen. |
| m_pRcvd Desired IDs | This member is a pointer to a temporary area used by the receiver methods for receiving the desired node list. |
| m_pRcvdBestNodeList | This member is a pointer to a temporary area used by the receiver methods for receiving the best node list. |
| m_nDiffCount | This member contains the number of nodes in the m_pNodeDiffs structure. |
| m_nDiffReady | This member contains the number of nodes that have participated in the vote phase. It is also used by the coordinator to detect when all nodes have sent their local information. |
| m_pNodeDiffs | This member points to a structure that contains the comparisons between this node's vote and the vote from all other nodes. Each entry has a flag that indicates if the other nodes see a Worse, Same, or Better TPA as this node. A consensus is reached when all nodes see the same TPA. This member is also used by the coordinator node 108 to record which nodes have sent their local information. |
| m_nDropCount | This member contains the number of nodes in the m_pDroppedNodes list. |
| m_pDroppedNodes | This member is a pointer to the list of nodes to be dropped from the TPA. The format of the list is identical to the m_pDesiredNodeList contained in the NodeConfig object. |
| m_bSynchronizeFlag | This member is used to synchronize the TPA nodes during the SelectTPA service. |
| | A node does not send its local information to the coordinator node 108 until this flag is set. |
| m_bSelStarted | This member is used to detect when the node has participated in at least one vote cycle. |
| m_TimeLimit | This member is the maximum time in seconds the caller can wait for a TPA. |
| m_Lock | This member is the used to lock the object during updates and decision points. |

GLOSSARY

TABLE XII

| | |
| --- | --- |
| BLLI | BYNET Low Latency Interface. This is a network paradigm that minimizes transport latency. |
| BNS | BYNET Network Service. The BYNET services provided for TPA-specific support. |
| Broadcast | The multicast transmission of a message to multiple nodes 106. |
| Coordinator Node | The coordinator node 108 controls the TPA selection phase of the configuration process. |
| Degraded Network | A condition where one or more nodes 106 are not connected to all nets. |
| Disjoint Network | A condition where two or more nodes 106 are unable to communicate to each other because they are on separate networks. |
| Dropped Node | A node 106 that must be dropped from the configuration because it is not accessible from all nodes in the selected TPA configuration. |
| Late-Joiner Node | A node 106 that attempts to join the TPA configuration after the TPA has been configured. |
| Monocast | A point-to-point circuit or transmission path between two nodes. |
| Multicast | A transmission path connecting multiple nodes. |
| Non-coordinator Node | A passive node during the TPA selection phase. |
| PDE | Parallel Database Extension. The extensions provided for TDBMS. |
| QBIC | Quad BYNET Interface Controller. |
| Network Service | A function or capability provided by the network interface for the TPA. |
| Single Processor Restart | A function wherein a single virtual processor can be restarted without effecting (or infecting) others in the system. |
| Split Network | A condition where each network in the system has less than a majority of nodes 106 attached. A TPA cannot be established for a split network. |
| TDBMS | Teradata Database Management System. |
| TPA | Trusted Parallel Application. An environment that supports parallel processing. |

Conclusion

This concludes the description of the preferred embodiments of the present invention. In summary, the present invention describes a method, apparatus, and article of manufacture for configuring a parallel processing system.

The method comprises the steps of selecting one of the interconnected nodes as a coordinator node, and the remaining nodes as non-coordinator nodes, the coordinator node for controlling the configuration of the parallel processing system; defining, in the coordinator node, a parallel processing system configuration having member nodes; and multicasting the parallel processing system configuration to the nodes.

The apparatus comprises a means for performing the steps described above, and the article of manufacture comprises a program storage device tangibly embodying computer instructions for performing the above method steps.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of configuring a parallel processing system having a plurality of interconnected nodes, comprising the steps of:

multicasting a best available node list and a best desired node list from each node to each node;

receiving the best available node list and the best desired node list from each node in each node;

selecting one of the interconnected nodes as a coordinator node, and the remaining nodes as non-coordinator nodes, said coordinator node being the node originating a best available node list that includes every node in the desired node list, the coordinator node for controlling the configuration of the parallel processing system;

defining a parallel processing system configuration having member nodes in the coordinator node; and multicasting the parallel processing system configuration to the member nodes.

2. The method of claim 1, further comprising the step of:

selecting the coordinator node as the node originating a best available node list that includes the greatest number of nodes in the desired node list.

3. The method of claim 1, wherein the step of defining a parallel processing system having member nodes in the coordinator node comprises the steps of:

multicasting a request from the coordinator node to at least one of the non-coordinator nodes to transmit a list of nodes reachable by the non-coordinator node;

receiving the list of nodes reachable by the non-coordinator node in the coordinator node;

generating a global view of the nodes reachable by the non-coordinator node;

generating a node list having the member nodes belonging to the configured parallel processing system according to a first criteria; and transmitting the node list to the member nodes.

4. The method of claim 3, wherein non-member nodes are nodes which are not member nodes and the method further comprises the step of transmitting a message to the non-member nodes indicating that the non-member nodes are excluded from the configured parallel processing system.

5. The method of claim 4, wherein the step of generating a node list having member nodes belonging to the configured parallel processing system according to the first criteria comprises the step of:

selecting the configured parallel processing system as the parallel processing system with a maximum number of reachable nodes.

6. The method of claim 1, further comprising the step of synchronizing the member nodes.

7. The method of claim 6, wherein the step of synchronizing the member nodes comprises the steps of:

receiving a registration request from each of the non-coordinator nodes in the coordinator node; and sending a wakeup request from the coordinator node to each of the non-coordinator nodes to wake the non-coordinator nodes from a sleep state after a registration request has been received from all of the non-coordinator nodes.

8. The method of claim 6, wherein the step of synchronizing the member nodes comprises the steps of:

transmitting a registration request from a non-coordinator node to the coordinator node;

commanding the non-coordinator node to a sleep state;

receiving a multicast wakeup message from the coordinator node in the non-coordinator node after a registration request is received from all of the non-coordinator nodes in the coordinator node; and waking the non-coordinator node in response to the wakeup message.

9. A method of configuring a parallel processing system having a plurality of interconnected nodes, said interconnected nodes defining a plurality of networks, said method comprising the steps of:

(A) selecting one of the interconnected nodes as a coordinator node, and the remaining nodes as non-coordinator nodes, the coordinator node for controlling the configuration of the parallel processing system;

(B) defining a parallel processing system configuration having member nodes in the coordinator node; said step of defining a parallel processing system having member nodes in the coordinator node comprising the steps of:

(1) multicasting a request from the coordinator node to at least one of the non-coordinator nodes to transmit a list of nodes reachable by the non-coordinator node;

(2) receiving the list of nodes reachable by the non-coordinator node in the coordinator node;

(3) generating a global view of the nodes reachable by the non-coordinator node, (4) generating a node list having the member nodes belonging to the configured parallel processing system according to a first criteria; the step of generating a node list having member nodes belonging to the configured parallel processing system according to the first criteria comprising the steps of:

(a) selecting the configured parallel processing system as the parallel processing system with a maximum number of reachable nodes; and (b) selecting the configured parallel processing system as the parallel processing system with access to the greatest number of networks if there are more than one parallel processing system configurations with the maximum number of reachable nodes; and (5) transmitting the node list to the member nodes; and (C) multicasting the parallel processing system configuration to the member nodes.

10. An apparatus for configuring a parallel processing system having a plurality of interconnected nodes, comprising:

means for multicasting a best available node list and a best desired node list from each node to each node;

means for receiving the best available node list and the best desired node list from each node in each node;

means for selecting one of the interconnected nodes as a coordinator node, and the remaining nodes as non-coordinator nodes, said coordinator node being the node originating a best available node list that includes every node in the desired node list, the coordinator node for controlling the configuration of the parallel processing system;

means for defining a parallel processing system configuration having member nodes in the coordinator node; and means for multicasting the parallel processing system configuration to the member nodes.

11. The apparatus of claim 10, further comprising:
means for selecting the coordinator node as the node originating a best available node list that includes the greatest number of nodes in the desired node list.

12. The apparatus of claim 10, wherein the means for defining a parallel processing system having member nodes in the coordinator node comprises:
means for multicasting a request from the coordinator node to at least one of the non-coordinator nodes to transmit a list of nodes reachable by the non-coordinator node;
means for receiving the list of nodes reachable by the non-coordinator node in the coordinator node;
means for generating a global view of the nodes reachable by the non-coordinator node;
means for generating a node list having the member nodes belonging to the configured parallel processing system according to a first criteria; and
means for transmitting the node list to the member nodes.

13. The apparatus of claim 12, wherein non-member nodes are nodes which are not member nodes and the apparatus further comprises means for transmitting a message to the non-member nodes indicating that the non-member nodes are excluded from the configured parallel processing system.

14. The apparatus of claim 12, wherein the means for generating a node list having member nodes belonging to the configured parallel processing system according to the first criteria comprises:
means for selecting the configured parallel processing system as the parallel processing system with a maximum number of reachable nodes.

15. The apparatus of claim 10, further comprising means for synchronizing the member nodes.

16. The apparatus of claim 15, wherein the means for synchronizing the member nodes comprises:
means for receiving a registration request from each of the non-coordinator nodes in the coordinator node; and
means for sending a wakeup request from the coordinator node to each of the non-coordinator nodes to wake the non-coordinator nodes from a sleep state after a registration request has been received from all of the non-coordinator nodes.

17. The apparatus of claim 15, wherein the step of synchronizing the member nodes comprises:
means for transmitting a registration request from a non-coordinator node to the coordinator node;
means for commanding the non-coordinator node to a sleep state;
means for receiving a multicast wakeup message from the coordinator node in the non-coordinator node after a registration request is received from all of the non-coordinator nodes in the coordinator node; and
means for waking the non-coordinator node in response to the wakeup message.

18. An apparatus for configuring a parallel processing system having a plurality of interconnected nodes, said interconnected nodes defining a plurality of networks, the apparatus comprising:
(A) means for selecting one of the interconnected nodes as a coordinator node, and the remaining nodes as non-coordinator nodes, the coordinator node for controlling the configuration of the parallel processing system;
(B) means for defining a parallel processing system configuration having member nodes in the coordinator node, said means for defining a parallel processing system having member nodes in the coordinator node comprising:
(1) means for multicasting a request from the coordinator node to at least one of the non-coordinator nodes to transmit a list of nodes reachable by the non-coordinator node;
(2) means for receiving the list of nodes reachable by the non-coordinator node in the coordinator node;
(3) means for generating a global view of the nodes reachable by the non-coordinator node;
(4) means for generating a node list having the member nodes belonging to the configured parallel processing system according to a first criteria, said means for generating a node list having member nodes belonging to the configured parallel processing system according to the first criteria comprising:
(a) means for selecting the configured parallel processing system as the parallel processing system with a maximum number of reachable nodes; and
(b) means for selecting the configured parallel processing system as the parallel processing system with access to the greatest number of networks if there are more than one parallel processing system configurations with the maximum number of reachable nodes; and
(5) means for transmitting the node list to the member nodes; and
(C) means for multicasting the parallel processing system configuration to the member nodes.

19. A program storage device, readable by a computer, tangibly embodying at least one program of instructions executable by the computer to perform method steps of configuring a parallel processing system having a plurality of interconnected nodes, the method steps comprising the steps of:
multicasting a best available node list and a best desired node list from each node to each node;
receiving the best available node list and the best desired node list from each node in each node;
selecting one of the interconnected nodes as a coordinator node, and the remaining nodes as non-coordinator nodes, said coordinator node being the node originating a best available node list that includes every node in the desired node list, the coordinator node for controlling the configuration of the parallel processing system;
defining a parallel processing system configuration having member nodes in the coordinator node; and
multicasting the parallel processing system configuration to the member nodes.

20. The program storage device of claim 19, wherein the method steps further comprise the method step of:
selecting the coordinator node as the node originating a best available node list that includes the greatest number of nodes in the desired node list.

21. The program storage device of claim 19, wherein the method step of defining a parallel processing system having member nodes in the coordinator node comprises the method steps of:

multicasting a request from the coordinator node to at least one of the non-coordinator nodes to transmit a list of nodes reachable by the non-coordinator node;

receiving the list of nodes reachable by the non-coordinator node in the coordinator node;

generating a global view of the nodes reachable by the non-coordinator node;

generating a node list having the member nodes belonging to the configured parallel processing system according to a first criteria; and transmitting the node list to the member nodes.

22. The program storage device of claim 21, wherein non-member nodes are nodes which are not member nodes and the method steps further comprise the method step of transmitting a message to the non-member nodes indicating that the non-member nodes are excluded from the configured parallel processing system.

23. The program storage device of claim 21, wherein the method step of generating a node list having member nodes belonging to the configured parallel processing system according to the first criteria comprises the method step of:

selecting the configured parallel processing system as the parallel processing system with a maximum number of reachable nodes.

24. The program storage device of claim 19, wherein the method steps further comprise the step of synchronizing the member nodes.

25. The program storage device of claim 24, wherein the method step of synchronizing the member nodes comprises the method steps of:

receiving a registration request from each of the non-coordinator nodes in the coordinator node; and sending a wakeup request from the coordinator node to each of the non-coordinator nodes to wake the non-coordinator nodes from a sleep state after a registration request has been received from all of the non-coordinator nodes.

26. The program storage device of claim 24, wherein the method step of synchronizing the member nodes comprises the method steps of:

transmitting a registration request from a non-coordinator node to the coordinator node;

commanding the non-coordinator node to a sleep state;

receiving a multicast wakup message from the coordinator node in the non-coordinator node after a registration request is received from all of the non-coordinator nodes in the coordinator node; and walking the non-coordinator node in response to the wakeup message.

27. A program storage device, readable by a computer, tangibly embodying at least one program of instructions executable by the computer to perform method steps of configuring a parallel processing system having a plurality of interconnected nodes, said interconnected nodes defining a plurality of networks, said method comprising the steps of:

(A) selecting one of the interconnected nodes as a coordinator node, and the remaining nodes as non-coordinator nodes, the coordinator node for controlling the configuration of the parallel processing system;

(B) defining a parallel processing system configuration having member nodes in the coordinator node; said step of defining a parallel processing system having member nodes in the coordinator node comprising the steps of:

(1) multicasting a request from the coordinator node to at least one of the non-coordinator nodes to transmit a list of nodes reachable by the non-coordinator node;

(2) receiving the list of nodes reachable by the non-coordinator node in the coordinator node;

(3) generating a global view of the nodes reachable by the non-coordinator node, (4) generating a node list having the member nodes belonging to the configured parallel processing system according to a first criteria; the step of generating a node list having member nodes belonging to the configured parallel processing system according to the first criteria comprising the steps of:

(a) selecting the configured parallel processing system as the parallel processing system with a maximum number of reachable nodes; and (b) selecting the configured parallel processing system as the parallel processing system with access to the greatest number of networks if there are more than one parallel processing system configurations with the maximum number of reachable nodes; and (5) transmitting the node list to the member nodes; and (C) multicasting the parallel processing system configuration to the member nodes.

* * * * *

UNITED STATES PATENT AND TRADEMARK OFFICE
CERTIFICATE OF CORRECTION

PATENT NO. : 6,745,240 B1
DATED : June 1, 2004
INVENTOR(S) : Denman, R. and Merritt, J.

It is certified that error appears in the above-identified patent and that said Letters Patent is hereby corrected as shown below:

Column 28,
Line 5, delete "walking" and insert -- waking --.

Signed and Sealed this

Third Day of January, 2006

JON W. DUDAS
*Director of the United States Patent and Trademark Office*